/

US010693946B2

(12) United States Patent
Argenti et al.

(10) Patent No.: US 10,693,946 B2
(45) Date of Patent: Jun. 23, 2020

(54) INSTANCE BACKED MOBILE DEVICES

(71) Applicant: Amazon Technologies, Inc., Reno, NV (US)

(72) Inventors: Marco Argenti, Mercer Island, WA (US); Khawaja Salman Shams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 14/488,195

(22) Filed: Sep. 16, 2014

(65) Prior Publication Data

US 2016/0080474 A1    Mar. 17, 2016

(51) Int. Cl.
*H04L 29/08* (2006.01)
*H04L 12/26* (2006.01)
(Continued)

(52) U.S. Cl.
CPC ............ *H04L 67/10* (2013.01); *G06F 9/5072* (2013.01); *G06F 9/5083* (2013.01); *G06F 9/542* (2013.01);
(Continued)

(58) Field of Classification Search
CPC ..... H04W 12/12; H04W 88/02; H04W 12/06; H04W 12/08; H04W 64/00; H04W 8/183; H04W 12/02; H04W 4/043; H04W 8/22; H04W 24/00; H04W 28/18; H04W 4/02; H04W 8/02; H04W 8/245; H04W 84/18; H04W 8/18; G06F 21/60; G06F 9/5072; G06F 9/5083; G06F 9/542; G06F 21/88; G06F 2009/4557; G06F 21/50; H04L 63/12; H04L 63/0442; H04L 63/10; H04L 63/145; H04L 63/083; H04L 43/10;
(Continued)

(56) References Cited

U.S. PATENT DOCUMENTS 6,249,836 B1 * 6/2001 Downs .................. G06F 9/5044
703/27
6,665,565 B1 * 12/2003 Stomberg ............. A61B 5/0031
607/31

(Continued)

FOREIGN PATENT DOCUMENTS

WO    2014047073 A1    3/2014

OTHER PUBLICATIONS

International Search Report and Written Opinion dated Feb. 16, 2016, International Patent Application No. PCT/US2015/050513, filed Sep. 16, 2015.

(Continued)

*Primary Examiner* — Kevin T Bates
*Assistant Examiner* — Ranjan Pant
(74) *Attorney, Agent, or Firm* — Davis Wright Tremaine LLP

(57) ABSTRACT

A service provider may provide a companion computer system associated with a mobile device in order to facilitate operation of the mobile device. The companion computer system and the mobile device may be associated in a database operated by the service provider. Furthermore, the companion computer system may execute a component of an application on behalf of the mobile device, where the mobile device executes another component of the application.

20 Claims, 19 Drawing Sheets

(51) Int. Cl.
*G06F 9/50* (2006.01)
*G06F 9/54* (2006.01)
*G06F 9/455* (2018.01)

(52) U.S. Cl.
CPC ...... *H04L 43/10* (2013.01); *G06F 2009/4557* (2013.01); *Y02D 10/22* (2018.01); *Y02D 10/36* (2018.01)

(58) Field of Classification Search
CPC . H04L 63/1416; H04L 63/1425; H04L 63/30; H04L 67/10; H04L 29/06; H04L 67/01; H04L 41/12; H04L 65/102; H04L 67/141; H04L 63/1408; H04L 67/16
See application file for complete search history.

(56) References Cited

U.S. PATENT DOCUMENTS

| | | | |
|---|---|---|---|
| 7,805,706 | B1 | 9/2010 | Ly et al. |
| 8,621,069 | B1 | 12/2013 | Tompkins |
| 8,788,855 | B2 | 7/2014 | Cong et al. |
| 9,256,467 | B1 | 2/2016 | Singh et al. |
| 9,449,346 | B1* | 9/2016 | Hockey ............... G06Q 40/02 |
| 9,461,876 | B2 | 10/2016 | Van Dusen et al. |
| 9,753,669 | B2 | 9/2017 | Ben-Shaul et al. |
| 2003/0032417 | A1* | 2/2003 | Minear ............... G06F 8/62 455/419 |
| 2004/0040025 | A1 | 2/2004 | Lehtinen |
| 2004/0054997 | A1 | 3/2004 | Katragadda et al. |
| 2006/0136928 | A1 | 6/2006 | Crawford et al. |
| 2006/0168575 | A1* | 7/2006 | Bhatt ............... G06F 8/65 717/168 |
| 2006/0168581 | A1* | 7/2006 | Goger ............... G06F 8/61 717/174 |
| 2007/0118657 | A1 | 5/2007 | Kreitzer et al. |
| 2007/0245331 | A1* | 10/2007 | Daynes ............... G06F 9/44521 717/166 |
| 2010/0131792 | A1* | 5/2010 | Herrod ............... G06F 11/0742 714/2 |
| 2010/0153941 | A1* | 6/2010 | Borissov ............... G06F 8/65 717/168 |
| 2010/0318999 | A1* | 12/2010 | Zhao ............... G06F 9/5044 718/104 |
| 2011/0022633 | A1 | 1/2011 | Bernosky et al. |
| 2012/0297311 | A1* | 11/2012 | Duggal ............... G06F 9/468 715/740 |
| 2013/0029641 | A1 | 1/2013 | Hickie |
| 2013/0073600 | A1* | 3/2013 | Jenkins ............... G06F 9/5027 709/201 |
| 2013/0109371 | A1* | 5/2013 | Brogan ............... G06F 1/1626 455/420 |
| 2013/0191527 | A1 | 7/2013 | Ashok et al. |
| 2013/0297964 | A1 | 11/2013 | Hegdal et al. |
| 2014/0007214 | A1* | 1/2014 | Qureshi ............... G06F 21/10 726/12 |
| 2014/0149986 | A1 | 5/2014 | S M et al. |
| 2014/0153481 | A1 | 6/2014 | Draznin et al. |
| 2014/0173058 | A1 | 6/2014 | Twitchell, Jr. |
| 2014/0189388 | A1* | 7/2014 | Lynar ............... G06F 1/329 713/320 |
| 2014/0207680 | A1* | 7/2014 | Rephlo ............... G06Q 20/322 705/44 |
| 2014/0304356 | A1 | 10/2014 | Allen, Sr. et al. |
| 2014/0344446 | A1 | 11/2014 | Rjeili et al. |
| 2015/0058473 | A1 | 2/2015 | Grande |
| 2015/0256423 | A1* | 9/2015 | Stearns ............... H04L 43/045 709/224 |
| 2015/0331635 | A1 | 11/2015 | Ben-Shaul et al. |
| 2015/0350362 | A1* | 12/2015 | Pollack ............... H04L 67/2833 709/217 |
| 2016/0034295 | A1* | 2/2016 | Cochran ............... G06F 9/45558 718/1 |
| 2016/0048399 | A1* | 2/2016 | Shaw ............... G01D 1/18 718/1 |
| 2016/0062623 | A1* | 3/2016 | Howard ............... G06F 16/27 715/788 |
| 2016/0092248 | A1* | 3/2016 | Shani ............... G06F 9/45558 718/1 |
| 2016/0216991 | A1* | 7/2016 | Ansari ............... G06F 9/45558 |
| 2017/0180346 | A1 | 6/2017 | Suarez et al. |
| 2017/0235848 | A1 | 8/2017 | Van Dusen et al. |
| 2017/0262697 | A1 | 9/2017 | Kaps et al. |

OTHER PUBLICATIONS

He et al., "Elastic Application Container: A Lightweight Approach for Cloud Resource Provisioning," 26th IEEE International Conference on Advanced Information Networking and Applications, Mar. 26, 2012, pp. 15-22.
International Organization for Standardization/ International Electrotechnical Commission, "Information technology—Trusted Platform Module—Part 1: Overview," International Standard, ISO/IEC 11889-1(E), May 15, 2009, 20 pages.
International Organization for Standardization/International Electrotechnical Commission, "Information technology—Trusted Platform Module—Part 2: Design principles," International Standard, ISO/IEC 11889-2(E), May 15, 2009, 152 pages.
International Organization for Standardization/International Electrotechnical Commission, "Information technology—Trusted Platform Module—Part 3: Structures," International Standard, ISO/IEC 11889-3:2009(E), 204 pages.
International Organization for Standardization/International Electrotechnical Commission, "Information technology—Trusted Platform Module—Part 4: Commands," International Standard, ISO/IEC 11889-4:2009(E), 254 pages.
International Search Report and Written Opinion dated Feb. 4, 2016, International Patent Application No. PCT/US2015/059983, 12 pages.
Soltesz et al., "Container-based operating system virtualization: a scalable, high-performance alternative to hypervisors," ACM SIGOPS Operating Systems Review 41(3):275-287, Mar. 2007.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Van et al., "SLA-aware Virtual Resource Management for Cloud Infrastructures," IEEE Ninth International Conference on Computer and Information Technology, Oct. 11, 2009, pp. 357-362.
Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.
Xavier et al., "Performance evaluation of container-based virtualization for high performance computing environments," Parallel, Distributed and Network-Based Processing (PDP), 2013 21st Euromicro International Conference, Feb. 2013, pp. 233-240.
Zhao et al., "Experimental study of virtual machine migration in support of reservation of cluster resources," Proceedings of the 2nd international workshop on Virtualization technology in distributed computing, Nov. 2007, pp. 1-8.

(56) References Cited

OTHER PUBLICATIONS

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Thiele et al., "Embedded Software in Network Processors—Models and Algorithms," Lecture Notes in Computer Science 2211:416-34, Oct. 8, 2001.

* cited by examiner

INSTANCE BACKED MOBILE DEVICES

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed and depending on their needs. Additionally mobile devices are quickly outgrowing other form factors and the development of mobile applications is growing and becoming more ambitious.

BRIEF DESCRIPTION OF THE DRAWINGS

Various embodiments in accordance with the present disclosure will be described with reference to the drawings, in which.

DETAILED DESCRIPTION

Figure 1:
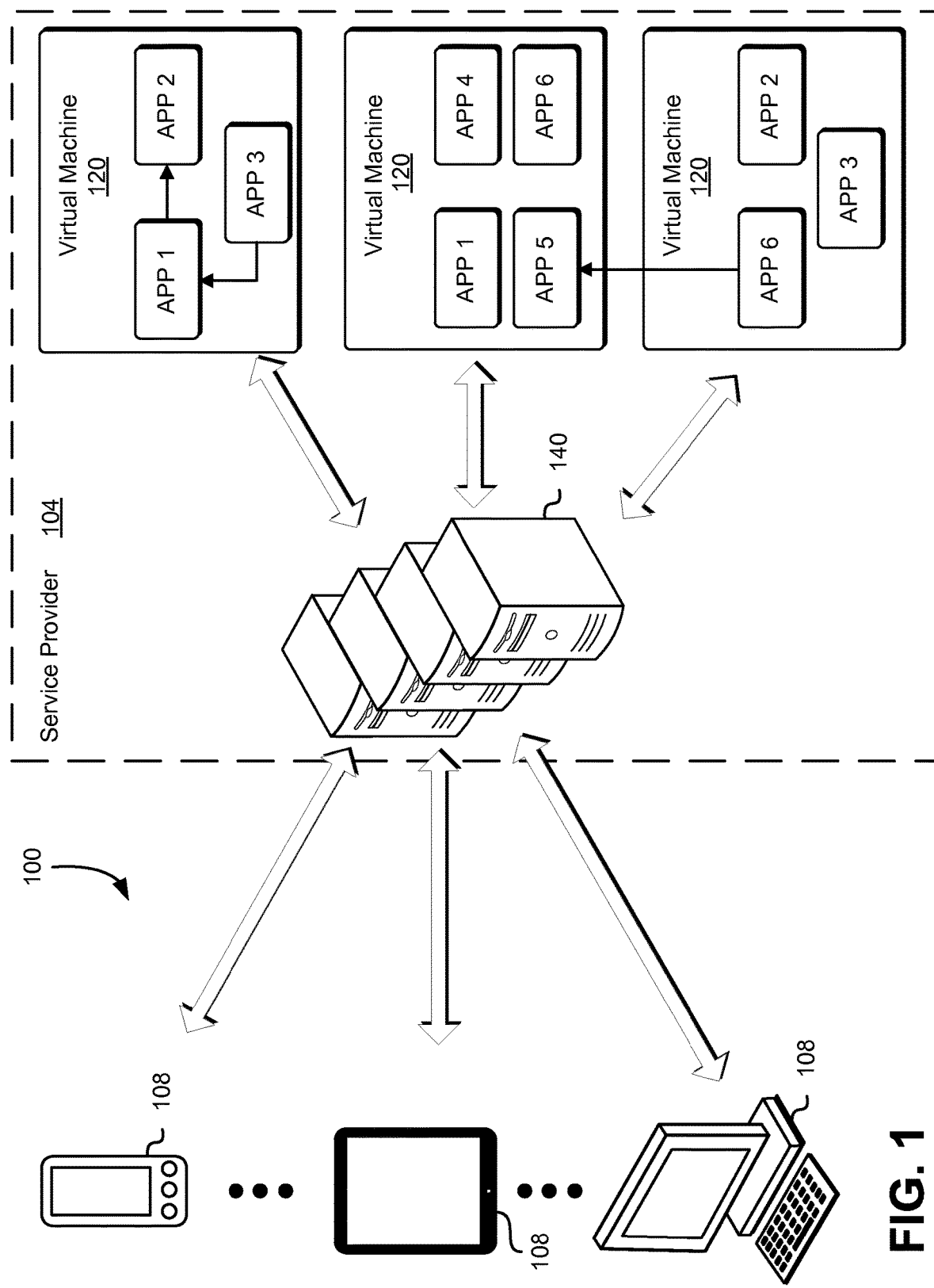
FIG. 1 is a diagram illustrating an environment including instance-backed mobile devices in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for mobile devices and applications executed by mobile devices. A mobile device may be associated with a virtual machine instance referred to herein as a companion virtual machine. The companion virtual machine may be used to consolidate traffic emanating from the associated mobile device and received by the associated mobile device. For example, the companion virtual machine may receive notifications on behalf of the mobile device and push the notifications to the mobile device when able to do so. This provides particular utility in situations where the mobile device has an intermittent connection to the Internet or other network. The companion virtual machine may be configured with a stable connection to the Internet or other network the mobile device may receive communications on. In some embodiments, the companion virtual machine may optimize the connection between the mobile device and one or more networks. For example, the companion virtual machine may pool connections between the mobile device in order to handle communication, absorb intermittent connectivity between the devices, and coalesce communication protocol handshakes and other types of connections on behalf of the mobile device.

In some embodiments, data transmitted between the mobile device and the companion virtual machine may be compressed. For example, the companion virtual machine may receive an image on behalf of the mobile device and compress the image to a size optimal for the display of the mobile device. In another example, the companion virtual machine may compress the image as a result of the mobile device being on a slow connection, allowing the mobile device to receive the image sooner. Additionally, the companion virtual machine may perform various operations and/or functions on behalf of the mobile device, for example, the companion virtual machine may automatically follow Hypertext Transfer Protocol (HTTP) redirects. The functions and/or operations performed by the companion virtual machine on behalf of the mobile device may minimize the amount of data sent and received from the mobile device itself, while also conserving battery power of the mobile device by optimizing use of the radio, the processor, the memory, and other portions of the mobile device. Furthermore, the companion virtual machine may provide continuity of communication between the mobile device and other devices, such as a webserver operated by a content provider.

For example, if the mobile device begins to load a webpage of the content provider, and loses connectivity and then re-establishes the connection at some point in time later, the companion virtual machine may maintain the connection during connection loss by the mobile device and eliminate connection time-out artifacts. Various other service and computer systems may communicate with the companion virtual machine without detecting that the mobile device has lost connectivity because the companion virtual machine may receive communications on behalf of the mobile device. The companion virtual machine may, in some embodiments, operate a web server on behalf of the mobile device. Packets and other information transmitted to the mobile device may be routed to the companion virtual machine aggregated and accepted on behalf of the mobile device. This may eliminate the need of the mobile device to poll multiple connections in order to receive notification and other information designated for the mobile device. The companion virtual machine may establish a single connection with the mobile device and transmit all of the data directly to the mobile device over the established connection.

The companion virtual machine may execute a set of applications on behalf of the mobile device aggregating connections between the set of applications and other devices including other companion virtual machines associated with other mobile devices. For example, a messaging application on a first mobile device may communicate with a second mobile device by causing the companion virtual machine associated with the first mobile device to transmit a message to a second companion virtual machine associated with the second mobile device. Additionally, the companion virtual machine may process data for the mobile device. For example, the mobile device may capture an image using a camera or similar sensor connected to the mobile device, the mobile device may then transmit the capture image to the companion virtual machine for processing, such as image enhancement or stitching multiple images into a single panoramic image. In some embodiments, a software development kit (SDK) may be exposed to developers in order to enable developers to utilize the companion virtual machine and mobile device as a single entity (i.e., a single logical unit). For example, a developer may develop a mobile application using the SDK, the SDK may be configured to determine which portion of the application is executed by the mobile device and which portion is executed by the companion virtual machine based on the capabilities or operation performed by the particular portion of the application. In various embodiments, the developer may indicate which portion of the application is to be executed by the mobile device or companion virtual machine. For example, the developer may tag an application programming interface (API) call or portion of the application as executed by the mobile device or executed by the companion virtual machine. Furthermore, the companion virtual machine or the mobile device may dynamically determine which portions of the application are executed by the companion virtual machine or mobile device. For example, if the mobile device is low on battery power a majority of the processing for an application may be performed by the companion virtual machine.

FIG. 1 illustrates an example environment 100 where one or more mobile devices 108, as well as the associated code running thereon, may be associated with a companion virtual machine 120. The companion virtual machine may execute applications and perform various operations on behalf of the mobile devices 108. The companion virtual machine may be any computer system or virtual computer system configured to execute at least a portion of an application corresponding to an application executed by the mobile device 108. The mobile devices 108 may be any suitable computer system, mobile phone, smartphone, tablet, portable computer or combination thereof capable of communicating with a companion virtual machine 120 through a service provider 104. The mobile device 108 may contain multiple application in memory. In some embodiments, a single companion virtual machine 120 may be instantiated per mobile device 108. Alternatively, the service provider 104 may provide a fleet of companion virtual machine 120 including multiple Internet Protocol (IP) addresses and a Network address translation (NAT) gateway configured to route traffic to the IP addresses. In this scenario, each mobile device 108 may be assigned a particular IP address and traffic for the particular mobile device 108 may be directed to the corresponding companion virtual machine 120 based at least in part on information provided by the NAT gateway.

The service provider 104 may operate system hardware 140, described in greater detail below, used to execute the companion virtual machines 120 and enable communication between the mobile device 108 and the companion virtual machine 120. The companion virtual machine may execute one or more applications on behalf of the mobile device 108. Furthermore, the companion virtual machine 120 may have a present power supply due to the system hardware that is executing the companion virtual machine 120 being connected to the power grid. In some embodiments, the mobile device 108 and the companion virtual machine 120 may each execute a copy of the applications and the applications may transmit data used during execution of the application between the mobile device 108 and the companion virtual machine 120. Additionally, separate applications may communicate between each other while being executed by the companion virtual machine. For example, a messaging application executed by the companion virtual machine 120 may communicate with a photo gallery application executed by the companion virtual machine 120.

Application executed by the companion virtual machine 120 may also transmit data to one or more other companion virtual machines 120. For example, the messaging application discussed above may transmit a message directly to one or more other companion virtual machines 120 associated with a mobile device 108. The companion virtual machine 120 may enable the recipient mobile device 108 to receive the message without requiring the recipient mobile device 108 to be connected to a network. In some embodiments, an agent application, described in greater detail below, may be used to facilitate the transmission and reception of notifications between the mobile device 108 and the companion virtual machine 120. For example, the companion virtual machine 120 may receive a message on behalf of the mobile device 108 and transmit a notification of the received message to the mobile device 108. At some point in time later, the mobile device 108 may obtain the message from the companion virtual machine 120. In some embodiments, the agent application may provide data corresponding to the state of the mobile device 108 and/or information collected by one or more sensors of the mobile device 108. For example, the agent may transmit GPS coordinates and accelerometer data to the companion virtual machine 120. The companion virtual machine 120 may perform a variety of operations based at least in part on the received information. For example, the companion virtual machine 120 may notify another companion virtual machine or other service provider that the mobile device is in a particular location.

Figure 2:
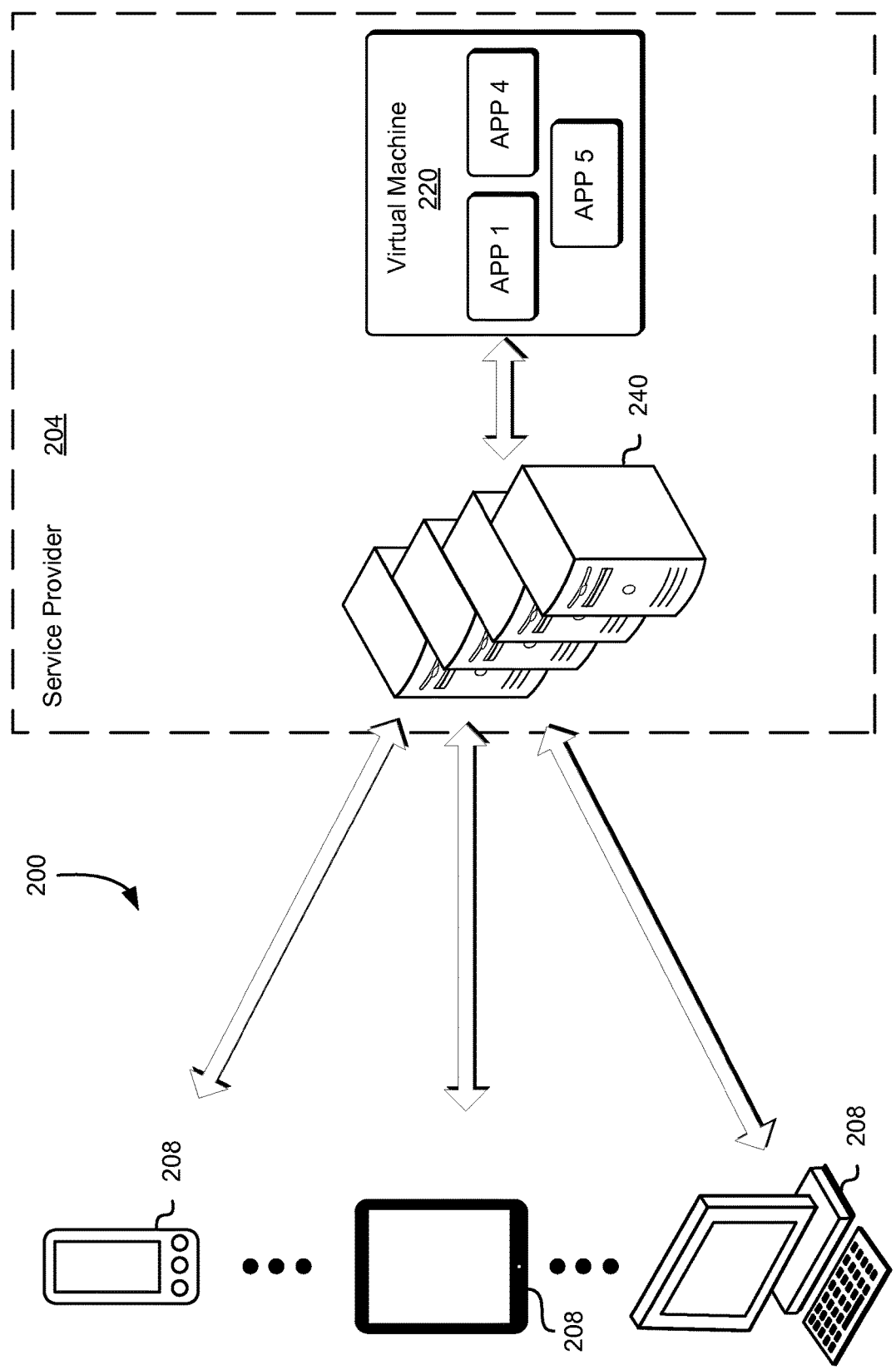
FIG. 2 is a diagram illustrating an environment including instance-backed mobile devices in accordance with at least one embodiment.

FIG. 2 illustrates an example environment 200 where one or more mobile devices 108 owned and/or associated with a single customer, as well as the associated code running thereon, may be associated with a companion virtual machine 120. A service provider 204 may provide a variety of services to the customer and the customer may communicate with the service provider 204 via an interface executed by the system hardware 240, which may be a web services interface or any other type of customer interface. The customer may be an organization that may utilize one or more of the services provided by the service provider 204 to maintain and deliver information to its employees, which may be located in various geographical locations. For example, the organization may provide employee with mobile device to enable communication between the various geographic locations the organization operates. Additionally, the customer may be an individual that utilizes the services of the computing resource service provider. The customer may communicate with the service provider 204, using the mobile device 208, through a network, whereby the network may be a communication network, such as the Internet, an intranet or an Internet service provider (ISP) network. Some communications from the customer to the service provider 204 may cause the service provider 204 to operate in accordance with one or more embodiments described herein or a variation thereof.

For example, the customer may, using the customer's mobile device 208, execute an application which may cause the service provider 204 to instantiate a companion virtual machine 102 on behalf of the customer. As illustrated in FIG. 2, the customer may be given a single companion virtual machine associated with one or more of the customer's mobile devices 208. For example, the customer may register one or more mobile devices with the service provider 208, and the registration process may associate the companion virtual machine 120 with the registered mobile devices 108. The companion virtual machine 120 may provide synchronization between the one or more mobile devices 208 owned by the customer. For example, the customer may modify the parental control settings for a particular application using a first mobile device 108. The companion virtual machine 120 may then cause the modification of the parental control settings to be applied to one or more other mobile devices 208 registered with the customer's account. Additionally, the customer may access one or more of the customer's mobile devices 208 from another device. For example, the customer's smartphone may not have enough battery power or otherwise may have been rendered inoperable, the customer may access the applications and other data contained on the smartphone by using another computer system connected to the companion virtual machine 120.

In some embodiments, the companion virtual machine 220 may execute software and other applications on behalf of the mobile device 208 and the mobile device 208 may execute a receiver application configured to connect to the companion virtual machine 220 and render the state of the companion virtual machine 220 on a display device connected to the mobile device 208. The companion virtual machine 220 may enable communication between one or more applications executed by the companion virtual machine 220 or one or more other companion virtual machines as described above in connection with FIG. 1. In some embodiments, the companion virtual machine 220 may be configured to alert an operated of a first mobile device of an activity of a second mobile device 208. For example, the customer may access a video streaming application on the customer's tablet and may receive a notification on the tablet from the companion virtual machine 220 that the customer's smartphone is attempting to access the same or a different application. The companion virtual machine 220 may enable the customer to notification corresponding to the activity of the customer's mobile devices 208 and enable the customer to determine access policies of the customer's mobile devices 208. For example, the customer may allow the customer's smartphone to access all of the application executed by the companion virtual machine 220 but may restrict certain application form executing on customer's tablet, which may be frequently utilized by children.

Figure 3:
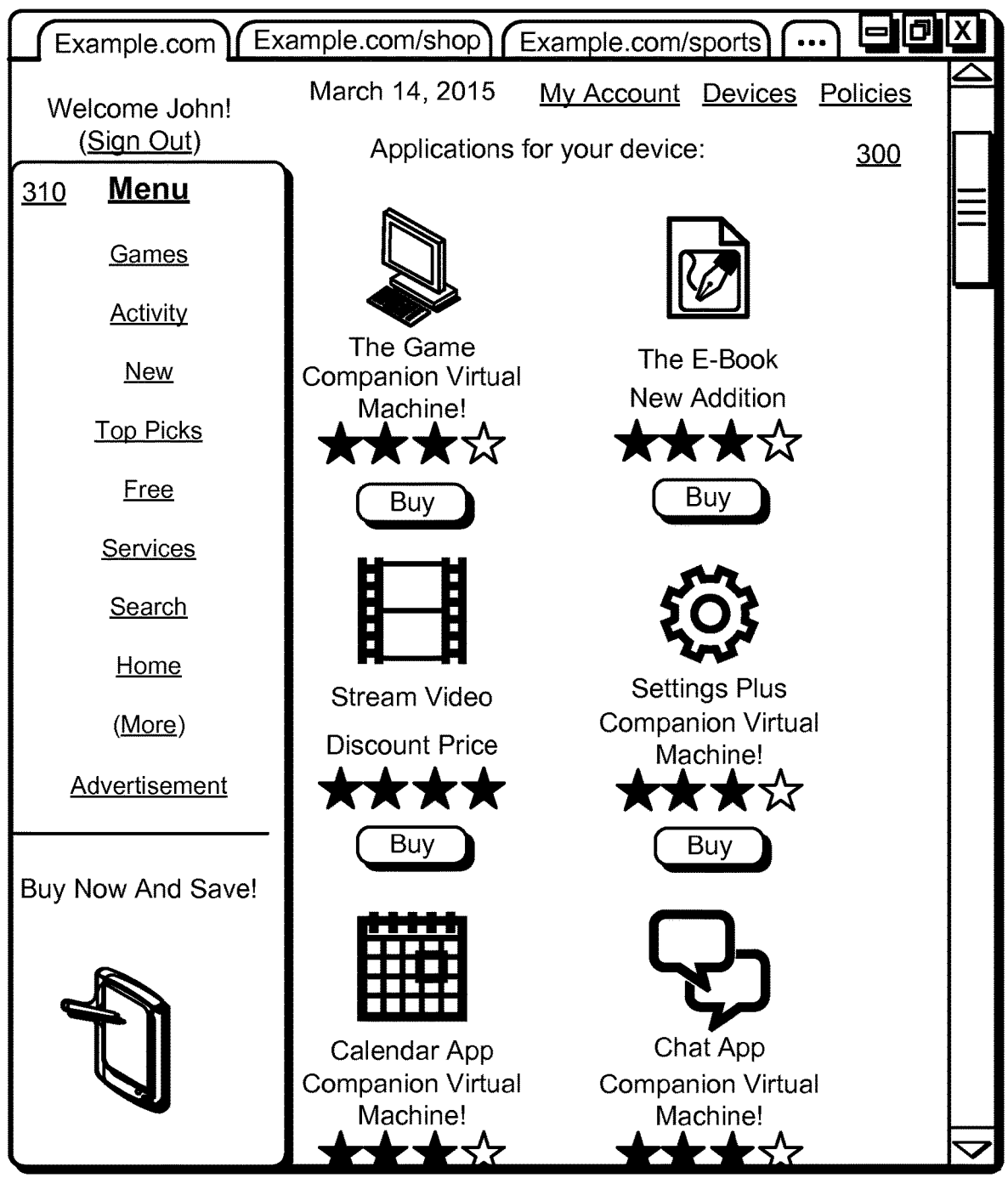
FIG. 3 is an illustrative example of a webpage for consuming instance-backed applications in accordance with at least one embodiment.

FIG. 3 shows a webpage 300 which may be displayed by an application executed by a mobile device enabling a customer to purchase or otherwise obtain one or more applications supported by a companion virtual machine. As illustrated in FIG. 3, the webpage 300 includes various graphical user interface elements that enable navigation throughout a mobile application store of which the webpage 300 is a part. In various embodiments, the webpage 300 is implemented by a service provider and the service provider is responsible for receiving customer input into the webpage 300 and transmitting the received input to various other services of the service provider configured to instantiate a companion virtual machine associated with the application or otherwise possess the customer's input. For example, as described in greater detail below, the customer's input may cause the service provider to enable the customer's mobile device and an associated companion virtual machine to access an application in order to install the application on the mobile device and the companion virtual machine. The webpage 300 may be displayed by various applications, such as a mobile application or web browser. In this example, the webpage 300 includes various navigational features. For instance, on the left-hand side of the webpage 300, various links 310 may link to one or more other webpages that contain additional content corresponding to the application store. In this example, the links appear as textual words which enable the links to be selected using an appropriate input device such as a keyboard, mouse, touchscreen or other input device. Selection of one of the links 310 may cause an application displaying the webpage 300 to submit, pursuant to a uniform resource locator (URL) associated with the selected link by the programming of the webpage 300, an HTTP request for the content associated with the link a server that provided the webpage 300 or another server. In this example, the webpage 300 also includes a graphical user element configured as a "buy" button. The buy button may be a graphical user interface element of the webpage 300 where the underlying code of the webpage 300 is configured such that selection by an input device of the buy button causes information corresponding to the selection to be transmitted to one or more servers of the service provider.

The webpage 300 may also include a description of the applications and/or other information associated with the applications displayed in webpage 300. The description may provide information to the customer including whether the application is associated with a companion virtual machine. In some embodiments, the mobile device may be provided with a companion virtual machine when an application or particular application is consumed from the application store. For example, a companion virtual machine may be instantiated and associated with the customer mobile device once the customer has downloaded and/or installed an application of the customer's mobile device that is supported by a companion virtual machine. In this example, the webpage 300 contains six applications that the customer may download and/or to the customer's mobile device. The applications may be provided by a developer, by the service provider, or any other party capable of posting application to the webpage 300. The executable code of the application may indicate whether the application utilizes a companion virtual machine.

Furthermore, the applications displayed in the webpage 300 may correspond to services offered by the service provider or one or more other organizations. For example, the services may include a messaging, delivery service or other service. The applications displayed on the webpage 300 may contain a presentation of the application such as a graphical representation of the service or operation associated with the application, which could be text and/or a drawing, photograph, description, identification number, trademark, video clip, audio clip or any other representation capable of representing the items. Other variations of the user interface displayed in FIG. 3 may be used in accordance with the present disclosure. For example, drop-down menus may be included in the user interface to enable the user to select a particular user account or information associated with a customer account to include when provisioning new mobile devices.

Figure 4:
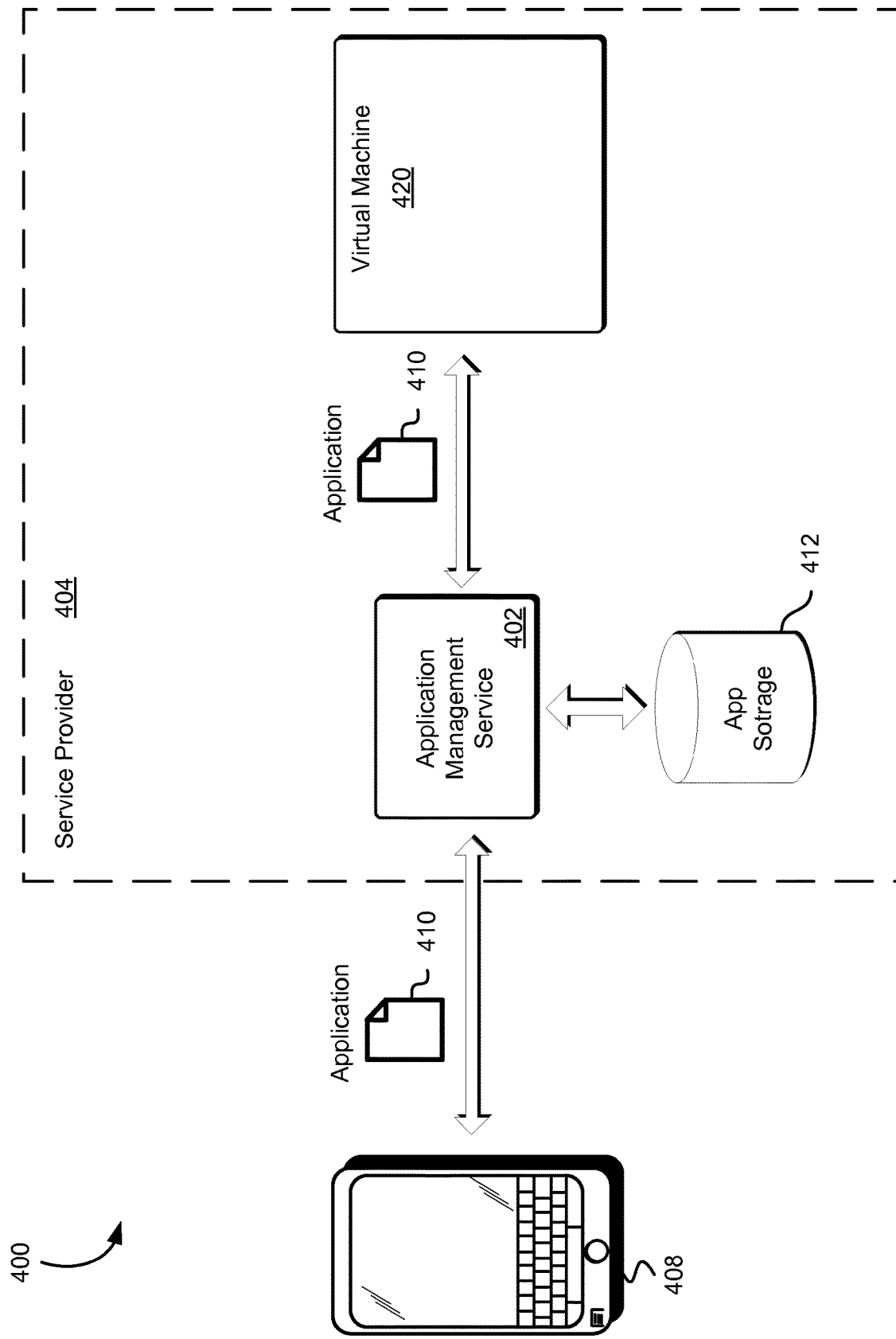
FIG. 4 is a diagram illustrating an environment for distributing applications to instance-backed mobile devices in accordance with at least one embodiment.

FIG. 4 illustrates an example environment 400 where a mobile device 408 owned and companion virtual machine 420 may obtain access to an application 410 in order to execute the application. A service provider 404 may provide system hardware in order to execute the companion virtual machine 420 as well as application data storage 412 in order to provide the application 410 to the mobile device 408 and the companion virtual machine 420. In some embodiments, the application may be divided into components each component executable by the mobile device 408 or the companion virtual machine 420. As described above, developers may tag components of the application as executed by the mobile device 408 or the companion virtual machine 420. When obtaining the application from the application data storage 412 the mobile device 408 and the companion virtual machine 420 may obtain only the component of the application executable by the respective computer system. The application data storage may comprise one or more computing resources that collectively operate to store data for an application using block-level storage devices or storage devices and/or virtualizations thereof. The service provider may also operate an application management service 402 configured to manage access to applications and provide updates to applications. The application management service 402 may be a collection of computing resources, such as a set of virtual machines executing a webserver, configured to provide the mobile device 408 and the virtual machine 420 with application based at least in part on customer input. In some embodiments, the application management service 402 contains an interface accessible by customer through the mobile device 408 or another device such as a laptop. The interface may be configured, as described above in connection with FIG. 3, such that the customer may consumer application and as a result the applications may be obtained by the mobile device 408 and/or the companion virtual machine 420 from the application data store 412. In some embodiments, the application management service 402 may first cause the application to be loaded into memory of the companion virtual machine 420 and then the mobile device 408. Furthermore, the companion virtual machine may receive an indication of a second application consumed and/or load into memory of the mobile device 408 and, as a result, may obtain a component of the application from the application data store 412.

For example, the customer may consume a particular application using the webpage described above, consumption of the particular application, by the customer, may cause the application management service 402 to provide a URL to the mobile device 408 which when followed by the mobile device 408 enables the mobile device 408 to obtain the portion of the application executable by the mobile device 408. Similarly, the application management service 402 to provide another URL to the companion virtual machine 420 which when followed by the companion virtual machine 420 enables the companion virtual machine 420 to obtain the portion of the application executable by the companion virtual machine 420. In some embodiments, the same URL is provided to both the mobile device 408 and the companion virtual machine 420. In still other embodiments, the application management service 402 may provide the application directly to the mobile device 408 and companion virtual machine 420.

The application management service 402 may, in some embodiments, operate the webpage described above in connection with FIG. 3. Furthermore, the application management service 402 may cause a companion virtual machine to be generated and/or instantiated. For example, the customer may purchase an application through the webpage described above or through an application, as a result the application management service 402 may transmit a request to one or more other services of the service provider 404, such as a virtual machine management service described in greater detail below, to instantiate a companion virtual machine 420 associated with the customer and/or the customer's mobile device. The virtual machine management service may then return an IP address or other information suitable for locating the companion virtual machine in response to the request. The application management service 402 may then provide the application 410 to the companion virtual machine 420 based at least in part on the information provided by the virtual machine management service.

Figure 5:
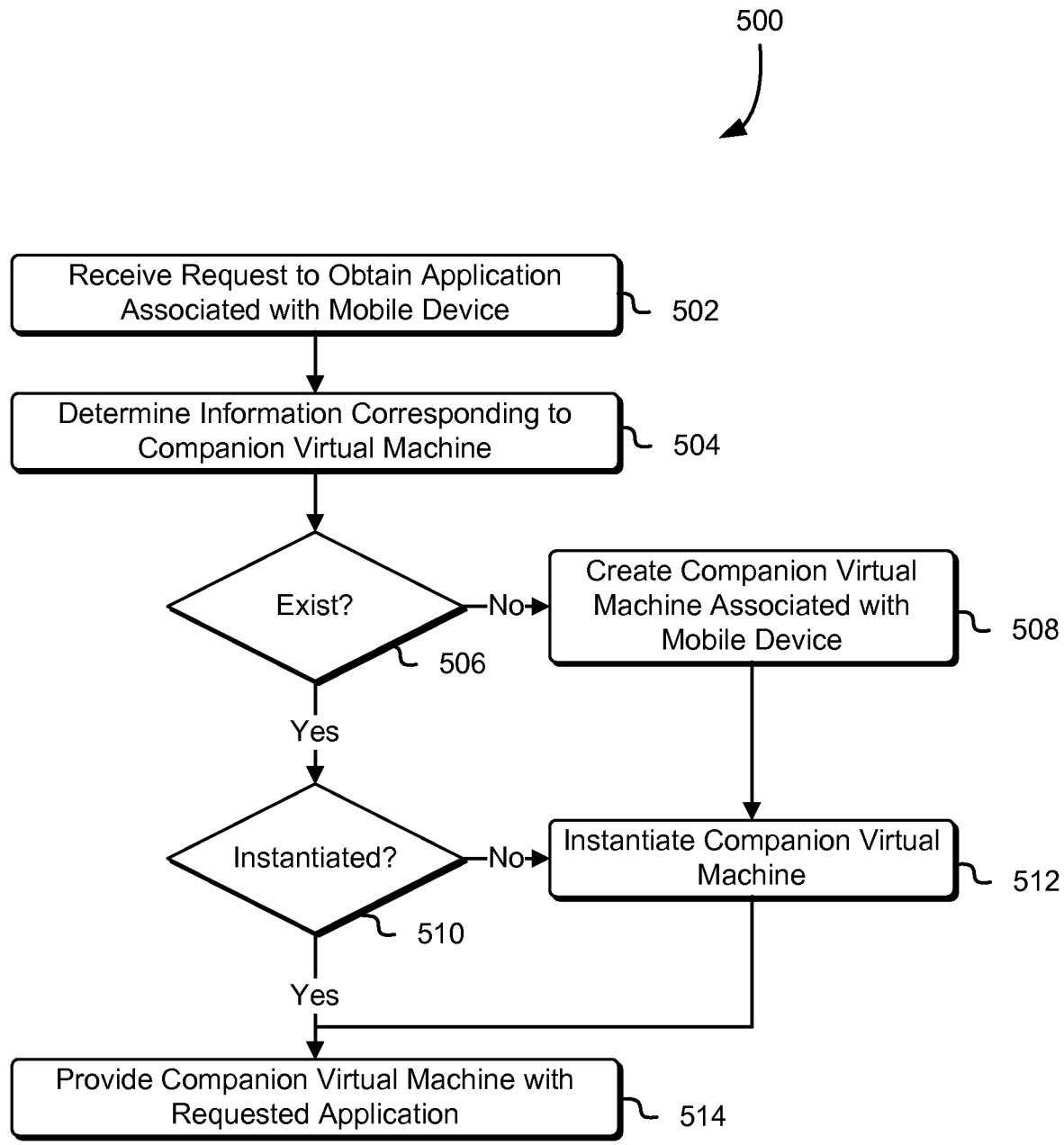
FIG. 5 is an illustrative example of a process for providing an instance-backed mobile device in accordance with at least one embodiment.

FIG. 5 shows an illustrative example of the process 500 which may be used to provide a companion virtual machine with an application. The process 500 may be performed by any suitable system such as the application management service described above in connection with FIG. 4 or the virtual machine management service. Returning to FIG. 5, in an embodiment, the process 500 includes receiving a request to obtain an application associated with a mobile device 502. The request may be generated by the mobile device as a result of receiving an input from a customer, such as selecting the buy button as described above. In some embodiments, the request may be transmitted by a registration service or other service responsible for managing applications installed or otherwise associated with the mobile device. For example, the registration service may determine a set of application installed on the mobile device that may be supported by a companion virtual machine and transmit a request to obtain the set of application on behalf of the companion virtual machine.

The computer system executing process 500 may then determine information corresponding to the companion virtual machine 504. For example, the application management service may transmit a request to the virtual machine management service to determine the status of the companion virtual machine. In various embodiments, process 500 is executed by the virtual machine management service and the virtual machine management service queries a database for the information corresponding to the companion virtual machine. The information corresponding to the companion virtual machine may include whether the companion virtual machine exists 506. If the companion virtual machine does not exist, the computer system executing process 500 may cause the companion virtual machine associated with the mobile device to be created 508. In some embodiments, creating the companion virtual machine may include transmitting a request to the virtual machine management service to create a virtual machine. The request may include various parameters of the virtual machine such as size, computing power, operating system, networking interface, virtual machine image or any other information suitable for generating a virtual machine.

Returning to process 500, if the companion virtual machine exists the computer system executing process 500 may then determine if the companion virtual machine is currently instantiated 510. If the virtual machine is not instantiated, the computer system executing process 500 may then cause the companion virtual machine to be instantiated 512. In some embodiments, the service provider or virtual machine management service may be configured to terminate or otherwise un-instantiate companion virtual machine when not used by the mobile device. The companion virtual machine may therefore be instantiated in order to obtain the application indicated in the request. Once the companion virtual machine has been instantiated the process 500 may continue and the computer system executing process 500 may provide the companion virtual machine with the requested application. For example, as described above in connection with FIG. 4, the application management service may provide the companion virtual machine with a URL to the application.

Figure 6:
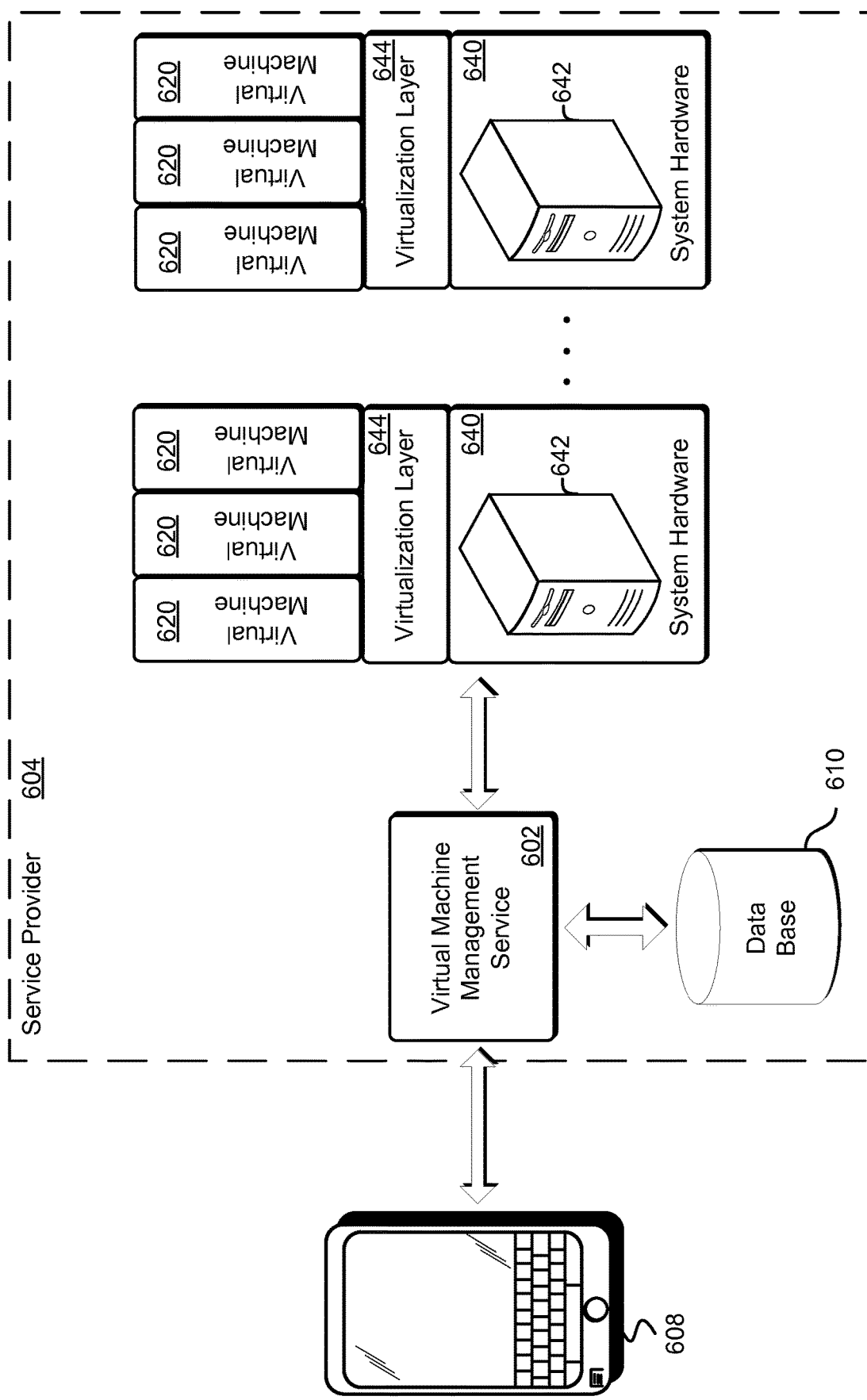
FIG. 6 is a diagram illustrating an environment including providing an instance to a mobile device in accordance with at least one embodiment.

FIG. 6 illustrates an environment 600 in which a virtual computer system service providing companion virtual machines for mobile devices in accordance with at least one embodiment. The virtual computer system service, which may be system hardware 640, is used by a service provider 604 to provide computational and other resources for mobile devices. The system hardware 640 may include physical hosts 642. The physical hosts 642 may be any device or equipment configured to execute instructions for performing data computation, manipulation or storage tasks, such as a computer or a server. A physical host 642 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications or data transfer protocol. The system hardware 240 may also include storage devices, such as storage disks and tapes, networking equipment and the like.

A virtualization layer 644 executing on the physical host 642 enables the system hardware 640 to be used to provide computational resources upon which one or more companion virtual machines 620 may operate. For example, the virtualization layer 644 may enable a companion virtual machine 620 to access system hardware 640 on the physical host 642 through virtual device drivers on the virtual machine 620. Furthermore, physical host 642 may host multiple companion virtual machines 620 of the same or different types on the same system hardware 640. The companion virtual machines 620 may be any device, software or firmware used for providing a computing platform for the mobile device 608. For example, the companion virtual machine may, in some embodiments, by implemented as a physical computer system configured to perform operations on behalf of the mobile device 608. Furthermore, the companion virtual machine 620 may be generated and/or instantiate as a result of the mobile device 608 completing a boot operations.

The virtual computing platform may include various virtual computer components, such as one or more virtual CPUs, virtual memory and the like. The companion virtual machines 620 may be provided to the customers of the service provider 604 and the customers may run an operating system or an application on the virtual machines 620 in support of the mobile device 608. Further, the service provider 604 may use one or more of its own virtual machines 620 for executing its applications, such as the application management service described above.

In some embodiments, the mobile device 608 may communicate with the corresponding companion virtual machine through the virtual machine management service 602. For example, the mobile device may transmit commands and other information to the virtual machine management service, the commands may indicate operations to be performed by the companion virtual machine. The commands and other information may be included in an API call from the virtual machine management service 602 to the companion virtual machine 620. The virtual machine management service 602 may enable the mobile device 608 to manage and operate the companion virtual machines 620.

For example, the mobile device 608 may transmit a request to the virtual machine management service 602 to have the companion virtual machine 620 process an image. The request may be an API call including information corresponding to the image and the companion virtual machines 620. The virtual machine management service 602 may determine the corresponding physical host 642 for the companion virtual machines 620 included in the request and transmit the image and/or request to the companion virtual machine. The virtual machine management service 602 may maintain a database 610 with one or more records containing information corresponding to the companion virtual machines 620. For example, the database 610 may contain a Domain Name System (DNS) entry indicating an IP address useable for communicating with a particular companion virtual machine. Returning to the example above, the virtual machine management service 602 may receive a request, from the mobile device, to interact with the corresponding companion virtual machine 620. The virtual machine management service 602 may locate the companion virtual machine 620 in the database 610 and transmit the request to the companion virtual machine 620.

In another example, the request from the mobile device may include a request to instantiate a companion virtual machine 620. The virtual machine management service 602 may then determine a physical host 642 capable of executing the companion virtual machine 620 on system hardware 640. The virtual machine management service 602 may then send the command to instantiate the companion virtual machine 620 to virtualization layer 644 on the determined physical host 642. The virtualization layer 644 may then instantiate the companion virtual machine 620. The virtualization layer 644 may then return information corresponding to the companion virtual machine 620 to the virtual machine management service 602 and the virtual machine management service 602 may record at least a portion of the information in the database 610. For example, the virtualization layer 644 may return location information corresponding to the companion virtual machine 620 which may then be stored in a record in the database associated with the mobile device 608.

Figure 7:
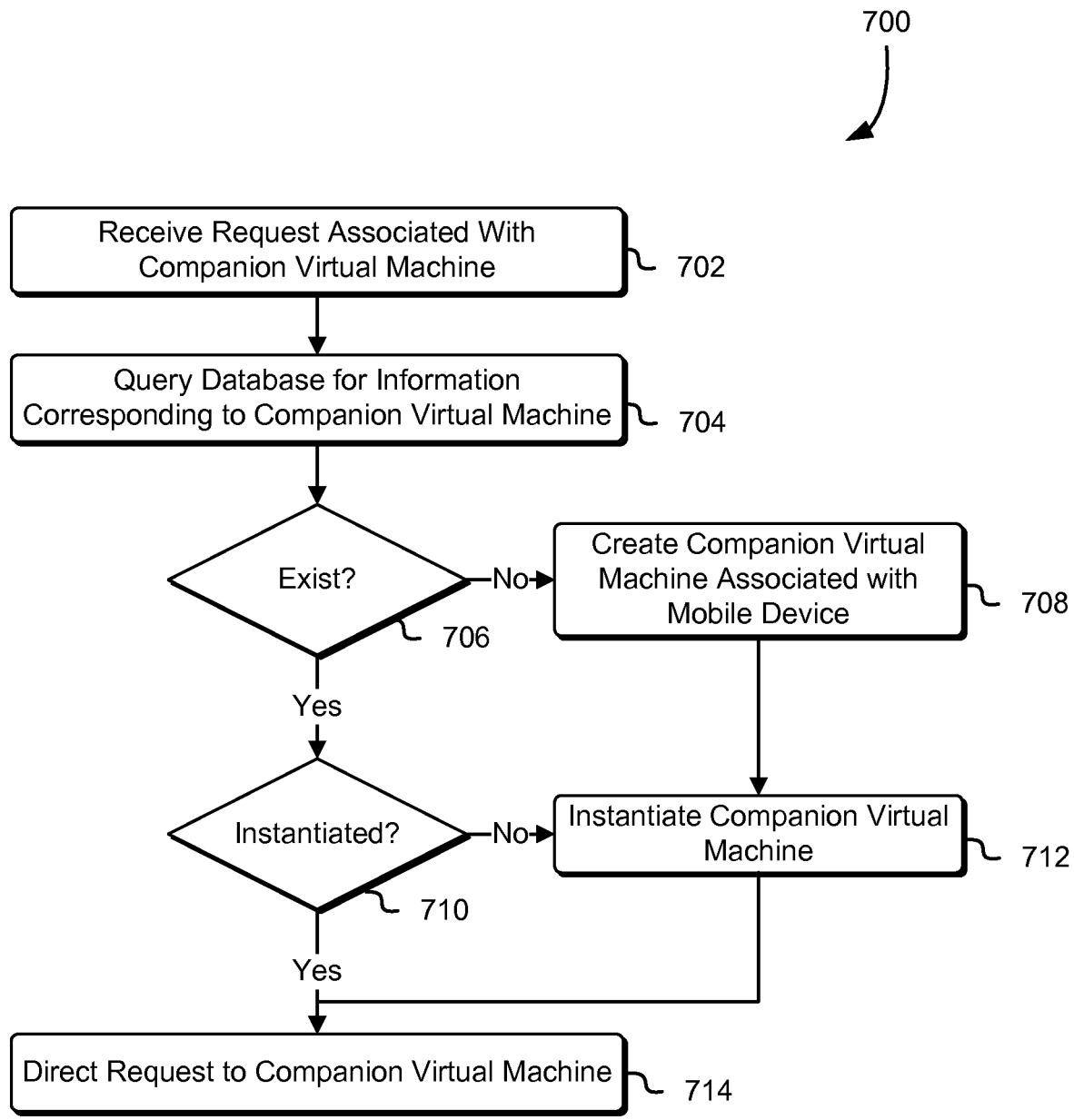
FIG. 7 is an illustrative example of a process for communicating with an instance-backed mobile device in accordance with at least one embodiment.

FIG. 7 shows an illustrative example of the process 700 which may be used to enable communication between a mobile device and corresponding companion virtual machine. The process 700 may be performed by any suitable system such as the virtual machine management service described above in connection with FIG. 6. Returning to FIG. 7, in an embodiment, the process 700 includes receiving a request associated with a companion virtual machine 702. The request may be generated by the mobile device as a result of receiving an input from a customer, such as performing an operation utilizing an application supported by a companion virtual machine. For example, the mobile device may include a media capture application supported by a companion virtual machine, the customer may cause the media capture application to perform an operation supported by the companion virtual machine, such as rendering a video. The mobile device executing the media capture application may then transmit a request to the companion virtual machine to perform at least a portion of the video rendering.

The computer system executing process 700 may then query a database for information corresponding to the companion virtual machine 704. For example, the virtual machine management service may query the database, as described above, in order to determine the status of the companion virtual machine. The information corresponding to the companion virtual machine may include whether the companion virtual machine exists 706. If the companion virtual machine does not exist, the computer system executing process 700 may cause the companion virtual machine associated with the mobile device to be created 708. The companion virtual machine may be created as described above.

Returning to process 700, if the companion virtual machine exists the computer system executing process 700 may then determine if the companion virtual machine is currently instantiated 710. If the virtual machine is not instantiated, the computer system executing process 700 may then cause the companion virtual machine to the instantiated 712. In some embodiments, the service provider or virtual machine management service may be configured to terminate or otherwise un-instantiate companion virtual machine when not used by the mobile device. The companion virtual machine may therefore be instantiated in order to process the request. Once the companion virtual machine has been instantiated the process 700 may continue and the computer system executing process 700 directs the request to the companion virtual machine.

Figure 8:
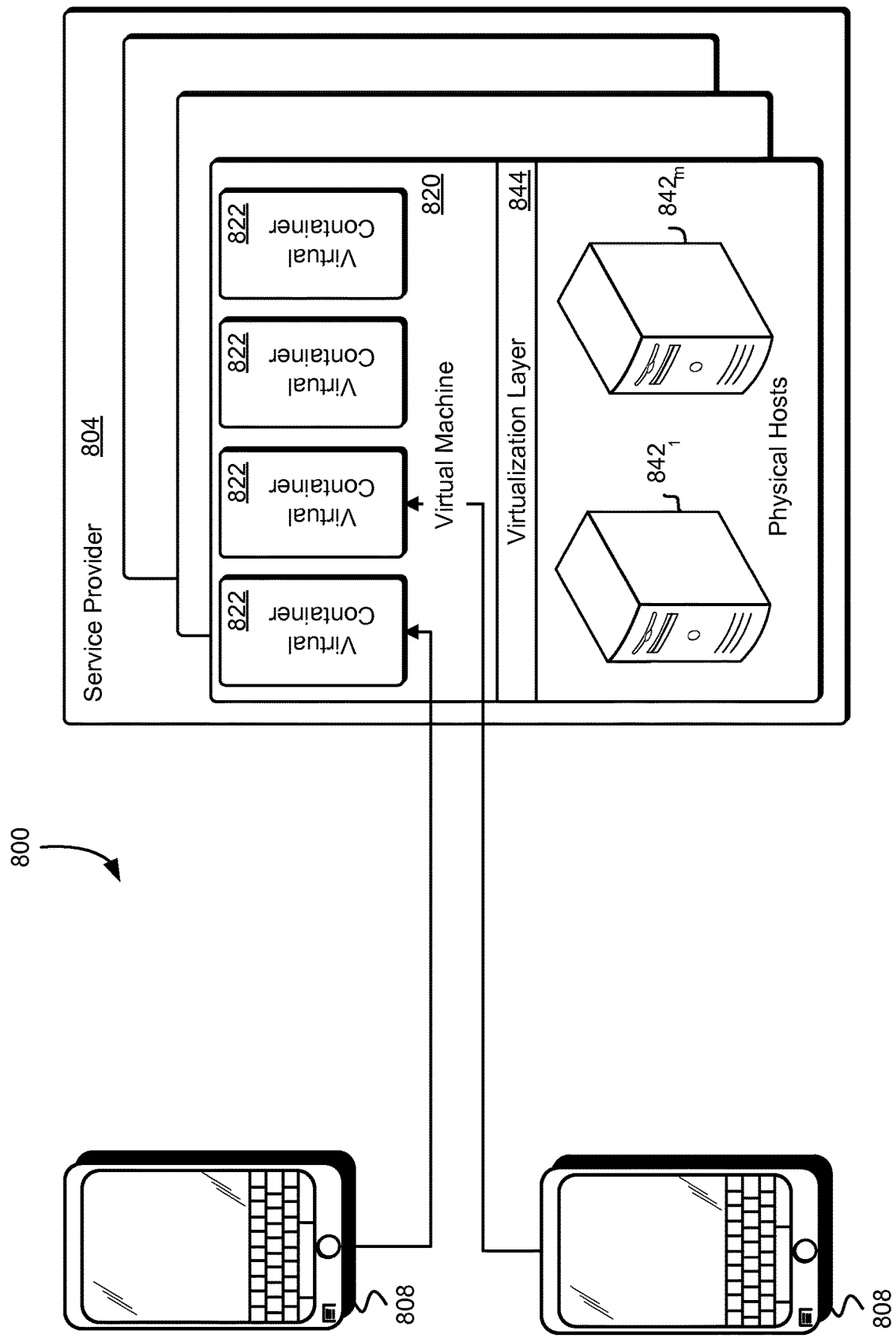
FIG. 8 is a diagram illustrating an environment including instance-backed mobile devices in accordance with at least one embodiment.

FIG. 8 illustrates an environment 800 in which a service provider 804 may provide companion virtual machines executed in a virtual container 822 for mobile devices 608 in accordance with at least one embodiment. A virtual computer system service, which may be system hardware, is used by a service provider 804 to provide computational and other resources for mobile devices. The system hardware may include physical hosts 642, virtualization layer 844 and virtual machines 820 as described above. As illustrated in FIG. 8, the virtual machines 820 may include one or more virtual containers 822. The one or more virtual containers 822 may be an alternative to operating system-level virtualization and enable the virtual machine management service to run multiple isolated systems (e.g., companion virtual machines) on a single virtual machine 820. The containers may be generated by the virtual machine management system using one or more API calls configured to cause the virtualization layer 844 and/or virtual machine 820 to instantiate one or more virtual containers 822.

The virtual containers 822 may execute the same kernel as the virtualization layer 844, but may also execute additional software and application on top of the kernel-level. For example, the virtual container 822 may execute the mobile device 608 operating system and applications. The kernel-level executable code may manage memory and file system access for the virtual container as it would for the virtualization layer 844. The virtual containers may obtain access to resources from the physical host 844 using inter-process communications to communicate with the virtualization layer 844. In this way a single virtual machine may provide multiple companion virtual machine to support multiple mobile device 808. This may allow for greater efficiency in that any one particular mobile device 808 may not constantly require support from the corresponding companion virtual machine.

Figure 9:
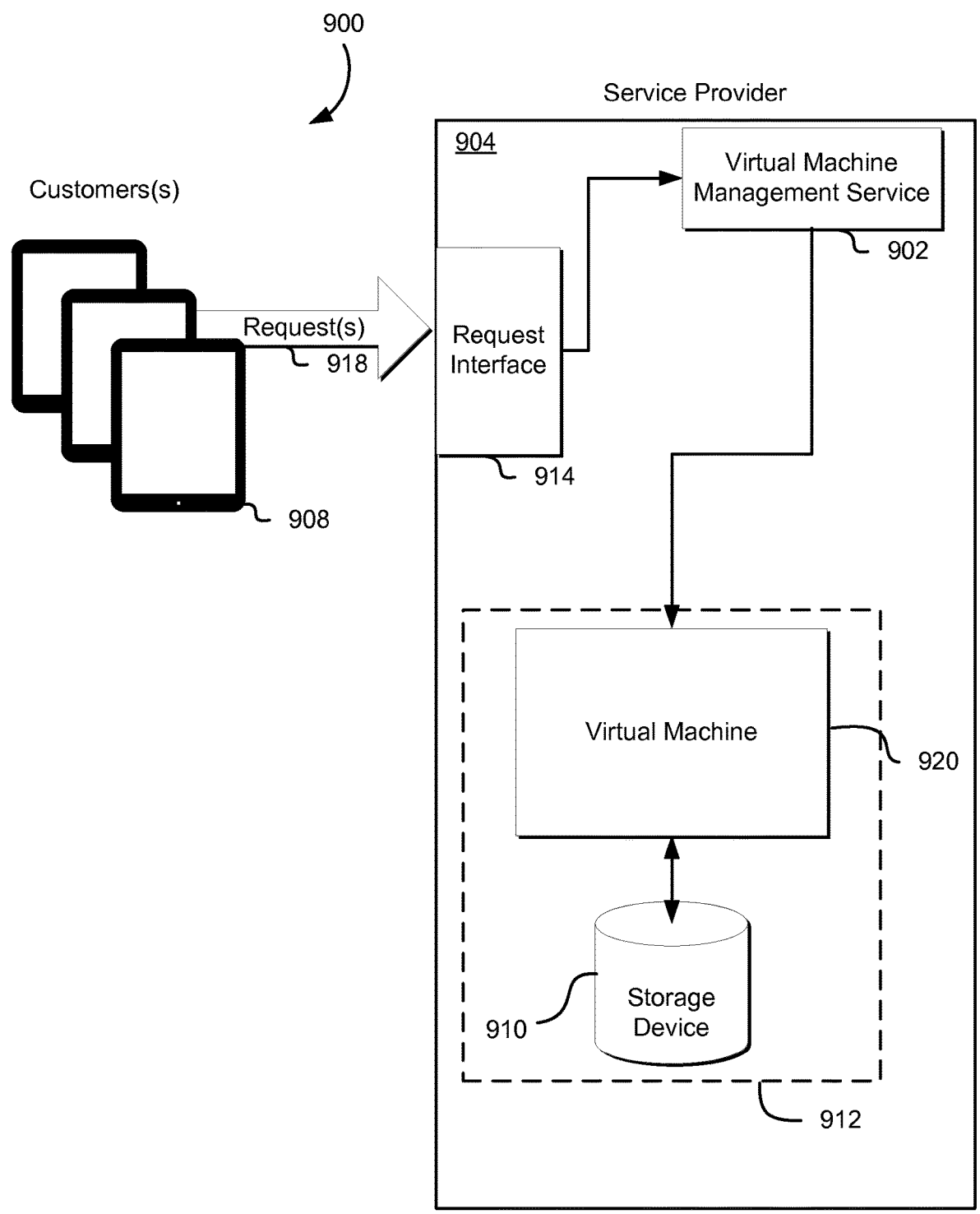
FIG. 9 is a diagram illustrating an environment for communicating with an instance from a mobile device in accordance with at least one embodiment.

FIG. 9 shows an example 900 of customers sending requests to a service provider 904 to interact with a companion virtual machine 920. The computing resource service provider 904 may provide a companion virtual machine 920 in order to support the operation of a mobile device 908. The customer may send requests 918 to the service provider 904 over a network, such as the Internet, the request may be generated by the mobile devices 908. The request 918 may be appropriately configured API calls generated by the mobile device 908 or application thereof such as an agent application described in greater detail below. In various embodiments, the requests 918 are received by a request interface 914 operated by the service provider 904. The request interface 914 may direct the request to the appropriate system, such as the virtual machine management service 902 shown in FIG. 9. As requests 918 are received by the request interface 914, information corresponding to the requests may be used to route the request 918 to the appropriate service and/or system. In some embodiments, the request interface 914 may query the virtual machine management service 902 to determine a location of the companion virtual machine 920 included in the request 918 and transmit the request 918 directly to the indicated companion virtual machine 920. In various embodiments the virtual machine management service 902 may manage the operation of one or more companion virtual machines 920. While FIG. 9 shows one request interface 914 for the service provider 904, each service of the service provider 904 may operate an interface and, generally, subsets of the services may have corresponding interfaces in addition to or as an alternative to the request interface 914.

Returning to FIG. 9, the companion virtual machine may execute in a container 912 or may otherwise be segregated such that communication between the companion virtual machine 920 and other systems of the service provider is limited. Additionally, the companion virtual machine may include a storage device 910, the storage device may be on-demand data storage, block-level storage, or any other suitable data store or virtualization thereof. The storage device 910 may be utilized to store information on behalf of the mobile device 908. For example, the companion virtual machine 920 may be configured to back up data generated by the mobile device 908 or data generated by the companion virtual machine 920 on behalf of the mobile device 908.

Figure 10:
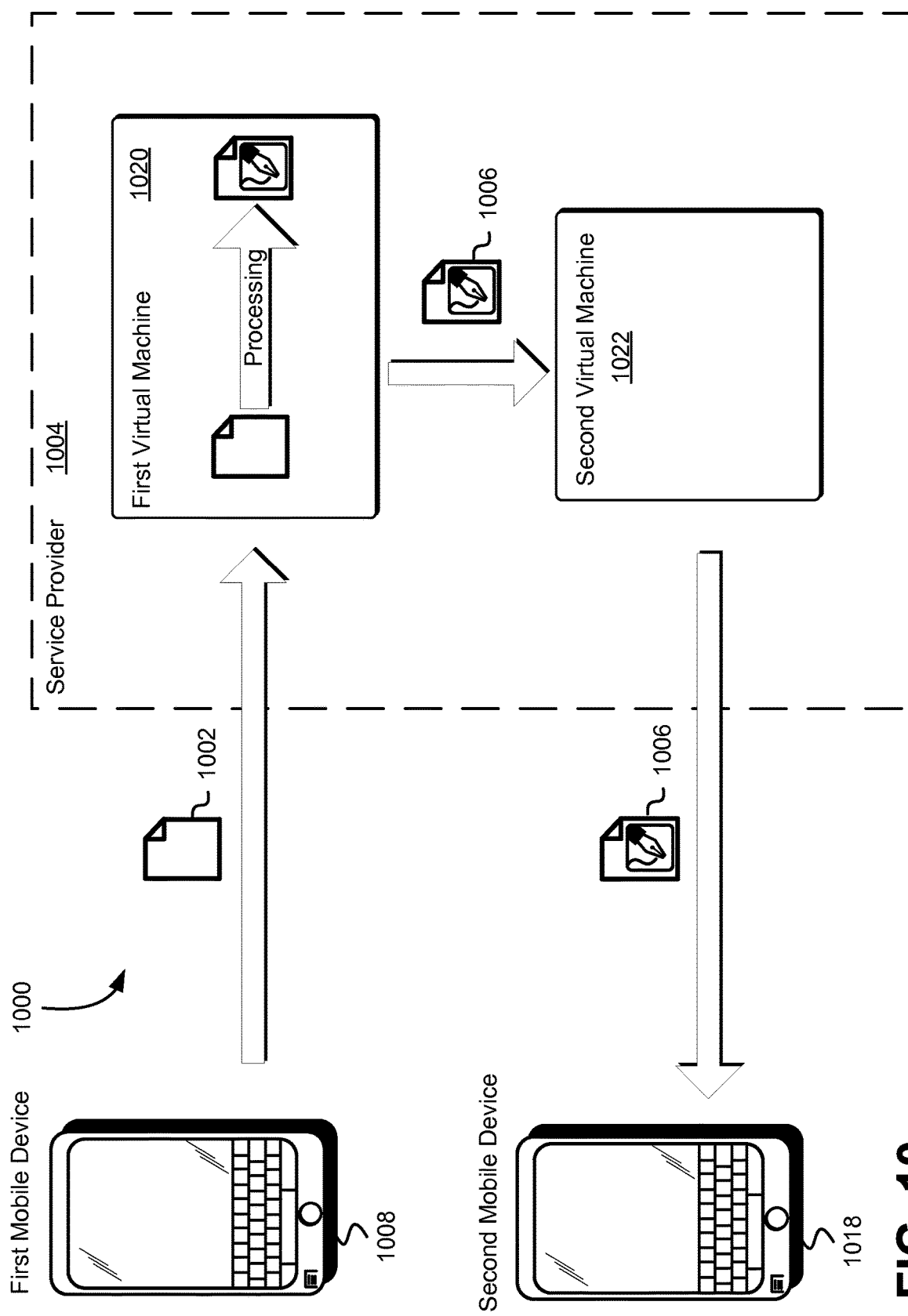
FIG. 10 is a diagram illustrating an environment for communicating between instance-backed mobile devices in accordance with at least one embodiment.

FIG. 10 illustrates an environment 1000 in which a service provider 1004 may enable two or more companion virtual machines to communicate on behalf of two or more mobile devices. A first mobile device 1008 may provide data 1002 to a first companion virtual machine 1020. For example, the first mobile device 1008 and the first companion virtual machine 1020 may execute an image capture application configured to capture images using one or more sensors attached to the first mobile device and provide the capture images to the first companion virtual machine 1020 for processing. In another example, the first mobile device 1008 may be configured to capture audio information using a microphone attached to the first mobile device 1008 and provide the captured audio information to the first companion virtual machine 1020 for processing. The first mobile device 1008 may transmit information for processing to the first virtual machine over a network, such as a mobile phone network or the Internet. The service provider 1004 may receive the information for processing and direct the information to the appropriate companion virtual machine as described above.

The first companion virtual machine 1020 may receive the data 1002 and generate processed data 1006 based at least in part on the received data 1002 from the first mobile device 1008. In some embodiments, the first companion virtual machine 1020 may execute an application or portion of an application associated with the received data 1002 and responsible for processing the received data 1020 in order to generate the processed data 1006. Furthermore, the application may be configured such that the processes or threads of the application are isolated from one or more other process of the first companion virtual machine 1020. In some embodiments, the processed data 1006 may be transmitted to one or more other mobile devices, such as the second mobile device 1018 illustrated in FIG. 10. Transmitting the processed data 1006 to the second mobile device may include transmitting the processed data 1006 to the second companion virtual machine 1022. The first companion virtual machine 1020 may execute an application configured to transmit data to other companion virtual machines. In various embodiments, the same application responsible for processing the data 1002 in or to generate the processed data 1006 is responsible for transmitting the processed data to the other companion virtual machines. In yet other embodiments, the companion virtual machines may include an agent, described in greater details below, configured to transmit and receive data between companion virtual machines.

The first companion virtual machine 1020 may provide the processed data 1006 to the second companion virtual machine 1022. The second companion virtual machine may receive the processed data on behalf of the second mobile device 1018. In some embodiments, the second companion virtual machine 1022 may perform additional processing of the data from the first companion virtual machine 1020. For example, the second companion virtual machine 1022 may decrypt the received data or may decompress the received data. Once the second companion virtual machine 1022 has received the processed data 1006, the second companion virtual machine 1022 may provide the processed data 1006 to the second mobile device 1018. Providing the processed data 1006 to the second mobile device 1018 may include transmitting a notification to the second mobile device, the notification enables the second mobile device 1018 to obtain the processed data 1006, or transmitting the processed data 1006 directly to the second mobile device 1018.

Additionally, various rules and/or events may be defined within a companion virtual machine, the rules may determine the behavior of the companion virtual machine based on certain inputs. For example, the first mobile device 1008 may provide data 1002 to the first companion virtual machine 1020. The data 1002 may include GPS coordinates or information corresponding to a network the first mobile device 1008 is connected to. Furthermore, the first companion virtual machine 1020 may include a rule that specifies a particular operation if the data 1002 has a certain value. For example, the rule may indicate that if the mobile device enters a particular location a notification is transmitted to the second mobile device 1018. Furthermore, the rules may include one or more complex events. For example, a rule may indicate a particular operation of the companion virtual machine is m of n rules are satisfied (m and n being positive integers), such as "start playing music if 7 of my 10 friends show up to the party." The companion virtual machines may be configured to distribute the data 1002 among a set of other companion virtual machines in order to determine if a particular rule has been satisfied. Returning to the example above, the companion virtual machines associated with the "friends" may be configure to provide the first companion virtual machine 1020 with location information corresponding to the mobile device assigned to the companion virtual machines associated with the "friends."

In another example, data 1002 may be aggregated from multiple mobile devices to a particular companion virtual machine. For example, data 1002 from an employees' mobile devices may be aggregated in a companion virtual machine assigned to an employer's mobile device. The companion virtual machine may use the data 1002 to notify the employer that a particular employee has entered a particular location. Similarly, an advertiser may use the data 1002 obtained by a companion virtual machine to determine the location of an operator of a mobile device assigned to the companion virtual machine and provide location based and/or location aware advertisements. Furthermore, the companion virtual machine may collect data 1002 from the mobile device and may provide the data to one or more services the mobile device is configured to utilize. For example, the companion virtual machine may provide location data to the companion virtual machine and the companion virtual machine may update a social networking service, a maps service, and a public transit service. This may eliminate the need for the mobile device to send location data to multiple services and may reduce the amount of network traffic to and from the mobile device.

Figure 11:
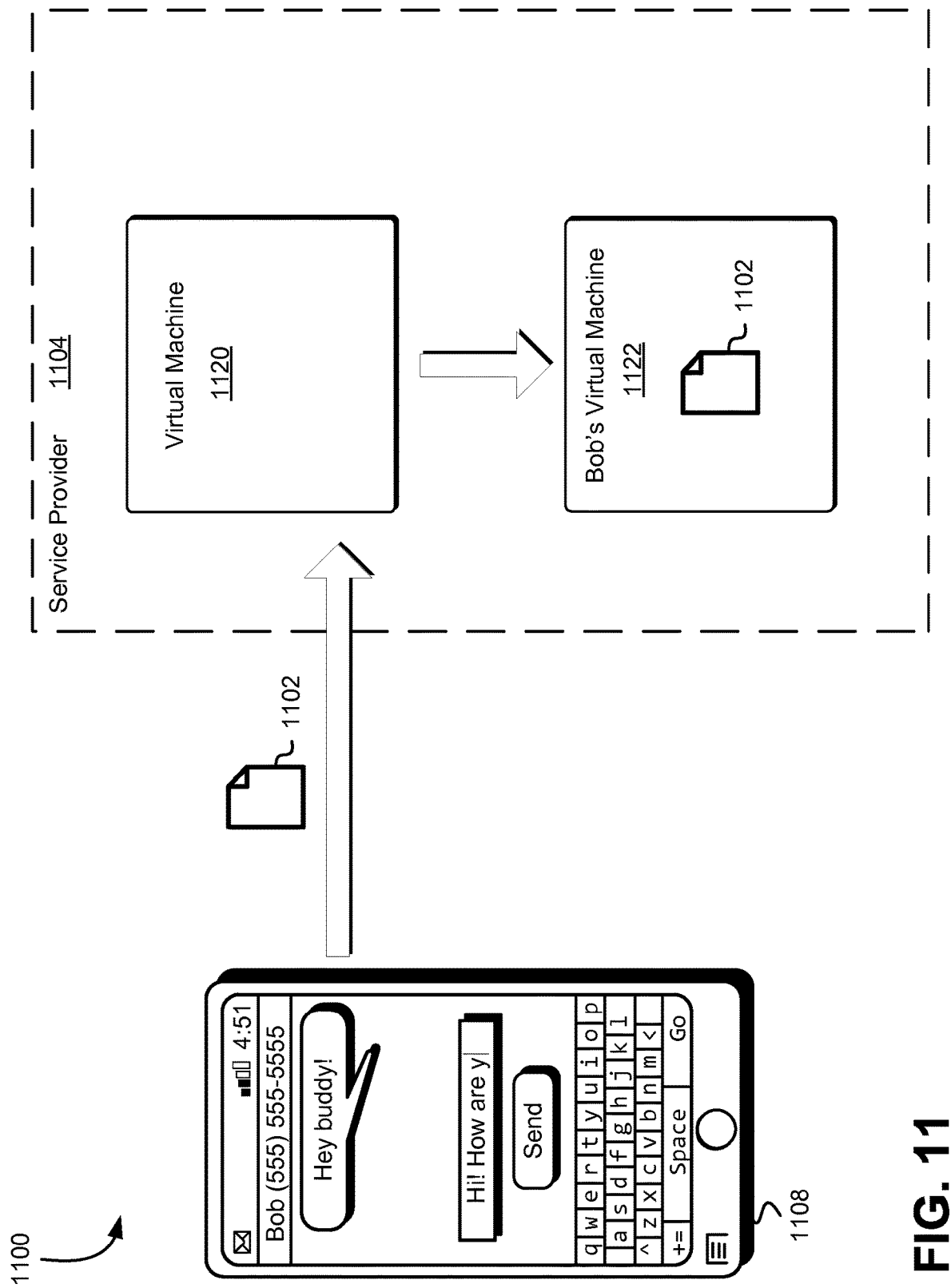
FIG. 11 is a diagram illustrating an environment for communicating between instance-backed mobile devices in accordance with at least one embodiment.

FIG. 11 illustrates an environment 1100 in which a service provider 1104 may enable two or more companion virtual machines to communicate on behalf of two or more mobile devices. A mobile device 1008 may provide a message 1002 or other data to a companion virtual machine 1120 as described above. The message 1102 may be generated by an application executed on the mobile device 1108 which is configured to receive input from a user through an input device connected to the mobile device 1108. As illustrated by FIG. 11, for example, the mobile device may include a touchscreen on which a keyboard is displayed which enables a customer to generate the message 1102. Furthermore, as illustrated by FIG. 11, the application may be configured such that the message may be directed to another mobile device by using a telephone number associated with the other mobile device. Once the customer selects the "send" button, which may be a graphical user interface element of the application execute by the mobile device 1108, the mobile device 1108 may transmit the message 1102 to the service provider 1104.

In some embodiments, once the message 1102 is received the companion virtual machine may process the message 1102 as described above. Furthermore, the message may include additional information configured to enable the companion virtual machine to direct the message 1102 to one or more intended recipients. For example, the message 1102 may include information corresponding to the intended recipients such as a telephone number, IP address, DNS entry, name, serial number, or other information configured to identify a recipient. The companion virtual machine 1120 may then utilize the additional information to determine location information usable to transmit the message 1102 to the intended recipients. For example, the companion virtual machine may query the virtual machine management service for an IP address associated with one or more telephone numbers included in the message 1102. The virtual machine management service may obtain the information from one or more records in a database as described above and provide the obtained information to the companion virtual machine 1120. In some embodiments, the request interface described above may determine the companion virtual machine intended to receive the message 1102 and provide companion virtual machine 1120 with information configured to locate the intended recipients based at least in part on the message. Returning to FIG. 11, the companion virtual machine 1120 may transmit the message 1102 to Bob's companion virtual machine 1122 based at least in part on information contained in the message 1102 indicating "Bob" as the intent recipient of the message 1102.

Figure 12:
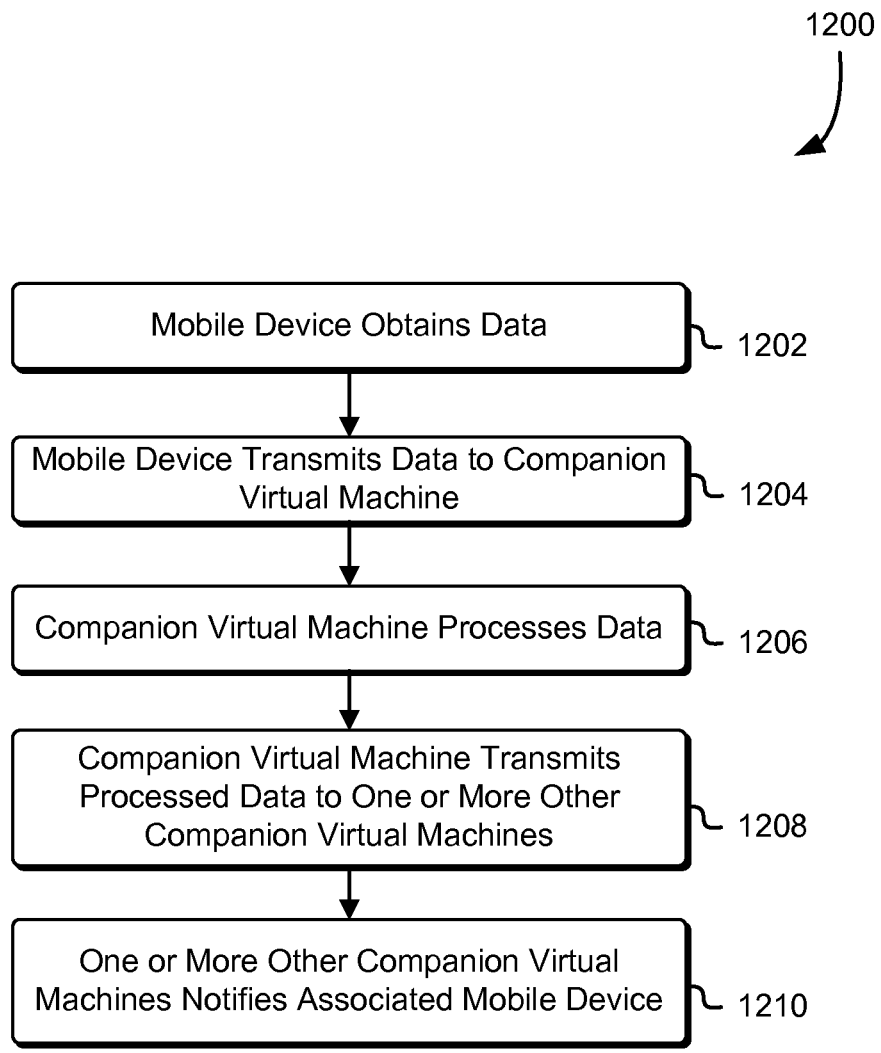
FIG. 12 is an illustrative example of a process for communicating with an instance-backed mobile device in accordance with at least one embodiment.

FIG. 12 shows an illustrative example of the process 1200 which may be used to enable communication between a mobile device and corresponding companion virtual machine. The process 1200 may be performed by any suitable system such as the mobile devices and corresponding companion virtual machines as described above. Returning to FIG. 12, in an embodiment, the process 1200 includes obtaining data by a mobile device 1202. Obtaining data may include receiving user input through an input device or capturing information using one or more sensors of the mobile device. The mobile device may also obtain information from one or more other computer systems. For example, the mobile device may obtain information from a webserver or other server over a network such as the Internet. The mobile device may then transmit the obtained data to the mobile device's companion virtual machine 1204. As described above, the mobile device may capture information from one or more sensors and transmit the information to the request interface of the service provider. The companion virtual machine may then process the data 1206 as described above in connection with FIG. 10. The companion virtual machine may determine based at least in part on the received data one or more companion virtual machines to transmit the processed data to.

The companion virtual machine may then transmit the processed data to one or more other companion virtual machines 1208. For example, as illustrated in FIG. 11, the companion virtual machine may determine one or more other companion virtual machines to transmit the message to, based at least in part on the message, and transmit the message to the determined companion virtual machines. Once received by the one or more other companion virtual machines, the one or more other companion virtual machines may transmit a notification to the corresponding mobile devices. In numerous variations of process 1200 the companion virtual machine may transmit the processed data back to the mobile device responsible for providing the data to the companion virtual machine. In another variation to process 1200, the companion virtual machine may not process the received data and may simply determine one or more other companion virtual machines to transmit the data to.

Figure 13:
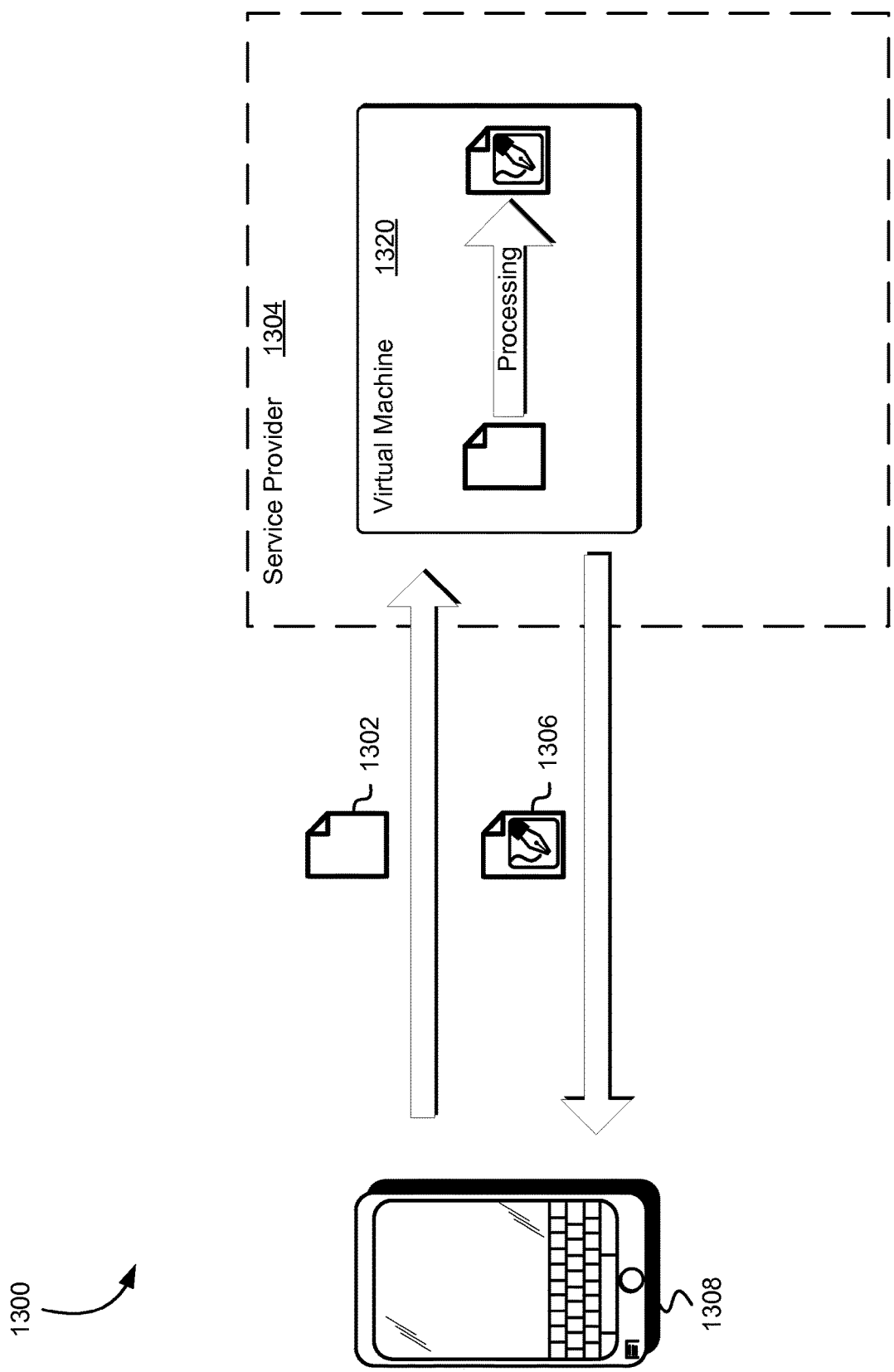
FIG. 13 is a diagram illustrating an environment for processing data by an instance-backed mobile device in accordance with at least one embodiment.

FIG. 13 illustrates an environment 1300 in which a service provider 1304 may enable a companion virtual machine 1320 to process data on behalf a mobile devices 1308. The mobile device 1308 may provide data 1302 to the companion virtual machine 1320. For example, the mobile device 1308 and the companion virtual machine 1320 may execute an image capture application configured to capture images as described above. Furthermore, the image capture application may contain at least two portions, a first portion configured to execute on the mobile device 1308 and a second portion configured to execute on the companion virtual machine 1320. The companion virtual machine 1320 may process the received data 1302 and generate processed data 1306 as described above. The companion virtual machine 1320 may provide the mobile device 1308 with a notification once the companion virtual machine has completed processing the data 1302 and generated the processed data 1306.

In some embodiments, the companion virtual machine 1320 may transmit the processed data 1306 directly to the mobile device 1308. If a notification is first sent, the companion virtual machine 1320 may wait for the mobile device 1308 to request the processed data 1306 before transmitting the processed data 1306 to the mobile device. In various embodiments, the companion virtual machine 1320 is configured to store the processed data 1306 in a storage device. In such embodiments, the companion virtual machine 1320 may provide a URL or other information configured to enable the mobile device 1308 to obtain the data from the storage device. The companion virtual machine 1320 may also determine whether to transmit the processed data 1306 to the mobile device 1308 or perform one or more other operations described above. For example, if the mobile device 1308 is low on battery power, the companion virtual machine 1320 may store the processed data 1306 in a storage device and provide the mobile device with a notification. In another example, if the mobile device 1308 has a slow connection or intermittent connection, the companion virtual machine 1320 may compress or otherwise reduce the size of the processed data 1306 before transmitting the data to the mobile device 1308.

Figure 14:
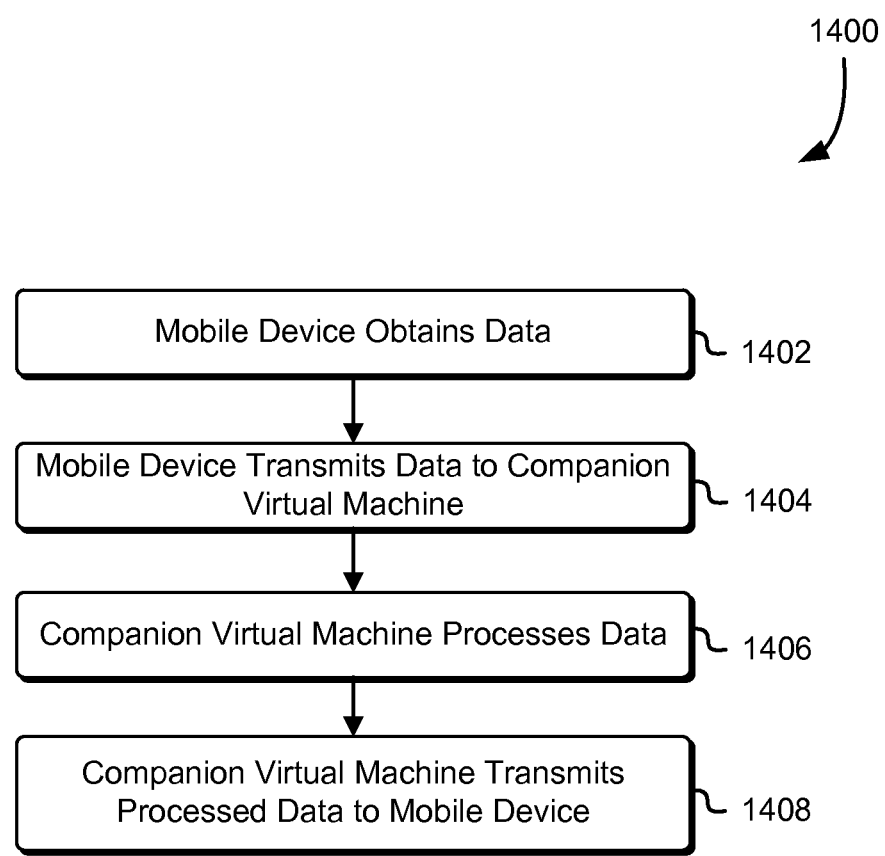
FIG. 14 is an illustrative example of a process for processing data by an instance-backed mobile device in accordance with at least one embodiment.

FIG. 14 shows an illustrative example of the process 1400 which may be used to enable a mobile device to utilize a companion virtual machine to perform various operations. The process 1400 may be performed by any suitable system such as the mobile devices and corresponding companion virtual machines as described above. Returning to FIG. 14, in an embodiment, the process 1400 includes obtaining data by a mobile device 1402. Obtaining data may include receiving user input through an input device or capturing information using one or more sensors of the mobile device. The mobile device may also obtain information from one or more other computer systems. For example, the mobile device may obtain information from a webserver or other server over a network such as the Internet. Additionally, the mobile device may perform some processing on the obtained data or may generate the obtained data by performing some processing. For example, the mobile device may start processing an image and determine to shift the processing of the image to the companion virtual machine based at least in part on one or more operating attributes of the mobile device such as processing power, amount of available memory, size of the image, battery power availed to the mobile device, or any other information suitable in determining whether to shift processing to the companion virtual machine.

The mobile device may then transmit the obtained data to the companion virtual machine associated with the mobile device 1404. The companion virtual machine may then process the data 1406 as described above in connection with FIG. 13. For example, the companion virtual machine may enhance an image captured by the mobile device or cause the obtained data to be stored in a storage device. The companion virtual machine may then transmit the processed data to the mobile device 1408. This may include transmitting a notification to the mobile device as described above in FIG. 13. The processed data may be transmitted to the mobile device as well as one or more other companion virtual machines associated with other mobile devices.

Figure 15:
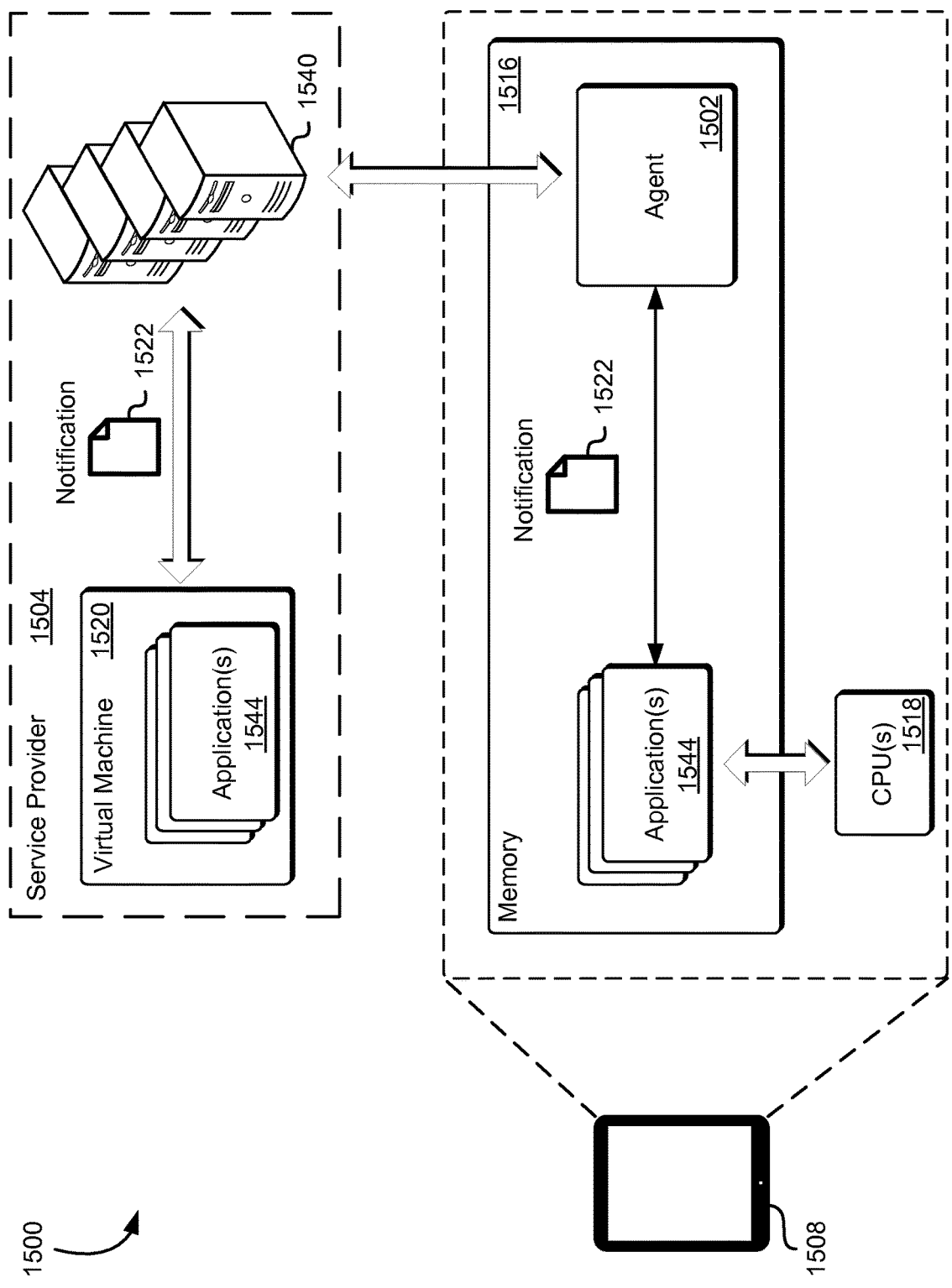
FIG. 15 is a diagram illustrating an environment for communicating with an instance-backed mobile device in accordance with at least one embodiment.

FIG. 15 illustrates an example environment 1500 where a companion virtual machine 1520, as well as the associated code running thereon, may provide a notification 1522 utilizing, at least in part, inter-process communications to communicate between an agent 1502 and one or more applications 1544. A mobile device 1508 may contain the one or more applications 1544 in memory 1516. Additionally, the companion virtual machine 1520 may also contain the one or more applications 1544 or portions therefor. The companion virtual machine 1520 may be executed by system hardware 1540 operated by a service provider 1504 as described above. The mobile device 1508 may be any suitable computer system as described above. The agent 1502 may be loaded into memory 1516 of the mobile device 1508 using a variety of different techniques. For example, the agent 1502 may be transmitted to the mobile device 1508 over a network connection and loaded into memory by a network interface of the mobile device 1508. Additionally, the agent 1508 may be included in the operating system loaded into the memory 1516 of the mobile device 1508. The companion virtual machine may receive a notification 1522 on behalf of the mobile device 1508 as described above. For example, a news application executed by the companion virtual machine may receive a notification from server including the latest news headlines. The notification 1522 may be transmitted, by the companion virtual machine 1520, to the agent 1502.

The agent 1502 may include executable instructions that, when executed by one or more processors 1518 (also referred to as CPUs or central processing units) of the mobile device 1508, cause the mobile device 1508 to perform various operations associated with the companion virtual machine, the one or more applications loaded in memory 1516 or other hardware of the mobile device 1508. For example, the agent 1502 may cause a notification to be displayed by a display device connected to the mobile device 1508. The agent 1502 may receive the notification 1522 and provide the notification 1522 to the one or more applications 1504. Returning to the example above, the agent 1502 may transmit the notification 1522 to the news application executed by the mobile device 1508.

As shown in FIG. 15, the mobile device 1508 includes at least the memory 1516 and one or more processors 1518. The mobile device 1508 may include one or more processors of a variety of different processors, such as CPUs or graphics processing units (GPUs), that provide computing functionality to the testing device. Examples of processors include those utilizing a complex instruction set computing (CISC) architecture, such as the x86 CPU, and others that utilize a reduced instruction set computing (RISC) architecture, such as the advanced RISC machine (ARM) CPU. The mobile device 1508 may include additional hardware not illustrated in FIG. 15 for simplicity. The data stored in the memory 1516 (programs, code modules, instructions) that, when executed by one or more processors 1518, may provide the functionality of one or more embodiments of the present disclosure. These application modules or instructions may be executed by the processors 1518. The memory 1516 may additionally provide storage for other software of the mobile device 1508 such as an operating system. The memory 1516 may include random access memory, read only memory, static memory, dynamic memory or any other storage mechanism suitable for storing executable code.

The mobile device 1508 may further include a network interface configured to communicate using any type of communication protocol including a cellular wireless communications protocol, such as fourth generation (4G) communications or long term evolution (LTE®), a wireless local area network (WLAN) communications protocol, such as an Institute for Electrical and Electronics Engineers (IEEE) 802.11, 802.16 or 802.21 communication protocol, or short range communications protocol, among others. The mobile device 1508 may further be equipped with a global positioning system (GPS) circuitry that enables locating the device. The mobile device 1508 may further be configured to provide GPS information to the companion virtual machine 1520 which may in turn provide the information to the one or more applications included in the companion virtual machine. In some embodiments, the one or more applications may be configured to communicate with one or more other computer systems. For example, the mobile device 1508 and companion virtual machine 1520 may include a navigation application configured to provide driving directions based at least in part on the GPS coordinates on the mobile device 1508. The navigation application may provide the GPS coordinates to a server configured to calculate a route based at least in part on the received coordinates.

The mobile device 1508, companion virtual machine 1520 and one or more other computer systems may communicate using one or more computer system ports. A computer system port is a network communications endpoint under the control of a host computer system operating system. A port may be associated with an (IP) address such as an IPv4 or IPv6 address, a port number assigned by the host operating systems, a port type also assigned by the host operating system and/or other such computer system associations. Ports may be used in modern computer systems to allow multiple services to share a single connection to a network by allowing those services to be uniquely associated with certain ports, thereby forwarding all port-addressed network connections to the uniquely associated services. Common port types include, but are not limited to, user datagram protocol (UDP) ports and transmission control protocol (TCP) ports (also referred to as transmission control protocol/Internet protocol (TCP/IP) ports). A port may be used by a host computer system to receive connections, or to receive data, or to initiate connections, or to wait for processes in other systems to complete, or to receive and process commands or for a combination of these and/or other such computer system functionality. Certain ports of a host computer system may be well known to allow remote computer systems to access certain well known services on a host computer system. For example, the companion virtual machine 1520 may receive connections on TCP port 80 for hypertext. In another example, the companion virtual machine 1520 may listen on various ports for notifications on behalf on the mobile device 1508. This may include monitoring a communication channel established in order to communicate with the mobile device 1508.

Figure 16:
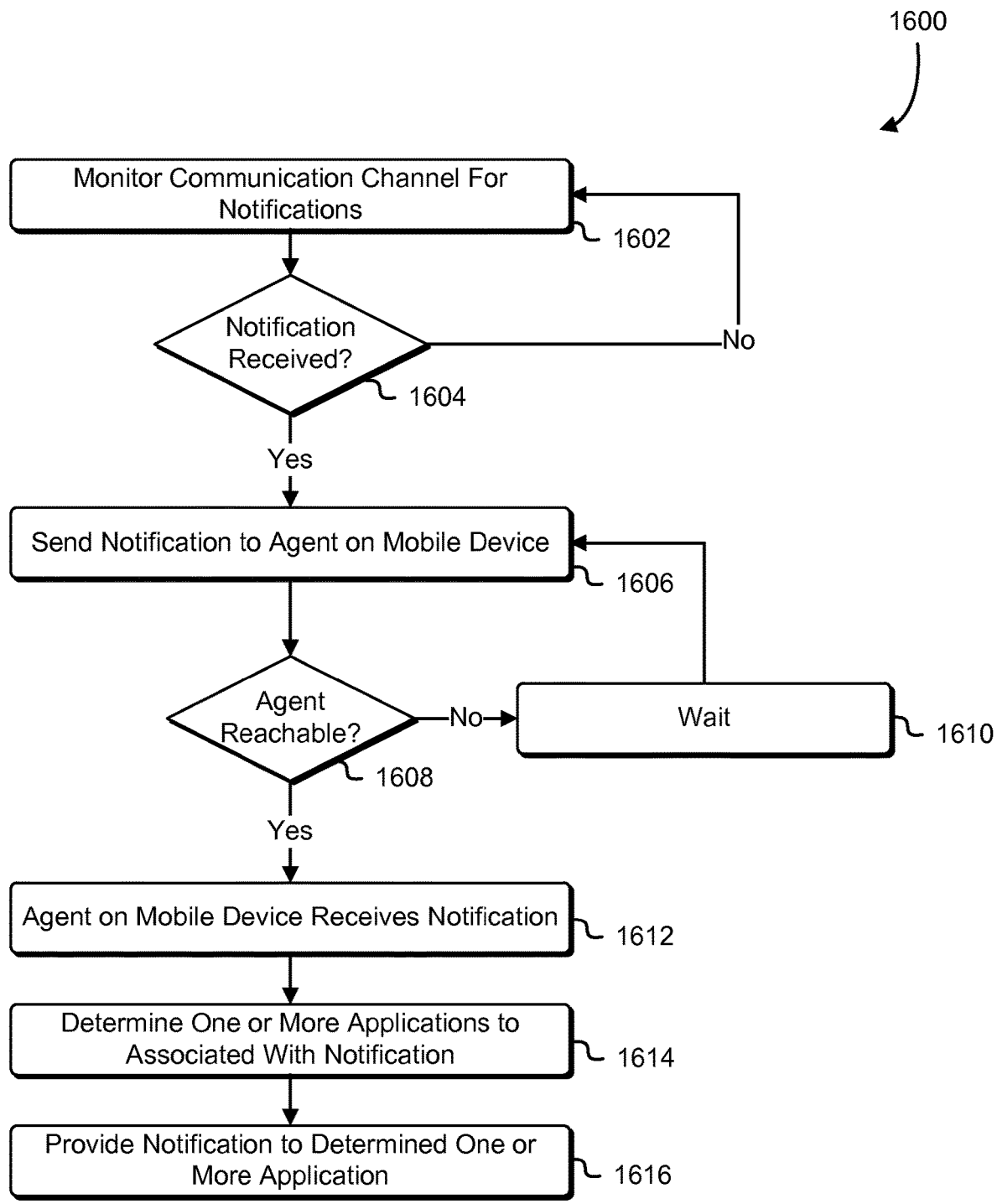
FIG. 16 is an illustrative example of a process for providing a notification to an instance-backed mobile device in accordance with at least one embodiment.

FIG. 16 shows an illustrative example of the process 1600 which may be used to receiving notification at a companion virtual machine and provide notifications to a mobile device. The process 1600 may be performed by any suitable system such as the mobile devices and corresponding companion virtual machines as described above. Returning to FIG. 16, in an embodiment, the process 1600 includes monitoring a communications channel for notifications 1602. The companion virtual machine may monitor one or more ports, as described above, in order to receive notification on behalf on the mobile device. The notification may be received from other companion virtual machines, mobile devices, or other computer systems. For example, the notification may include an e-mail message transmitted from an e-mail server. In another example, the notification may include a Short Message Service (SMS) text message from another mobile device.

If no message is received on the monitored communications channel 1604, the companion virtual machine may continue to monitor the channel 1602. If a message is received 1604, the companion virtual machine may cause a notification to be transmitted to an agent application executed by the mobile device 1606. If the agent is unreachable 1608 (e.g., the agent provides no response), the companion virtual machine may wait 1610 and re-transmit the notification to the agent 1606. If the agent is reachable, the agent may receive the notification 1612 and provide an indication to the companion virtual machine that the notification has been received. The agent may then determine one or more applications associated with the received notification 1614. For example, the notification may include an identifier of the applications associated with the notification. The agent may then provide the notification to the determine application 1616. For example, the application may register with the agent to receive notification through an inter-process communication channel.

Figure 17:
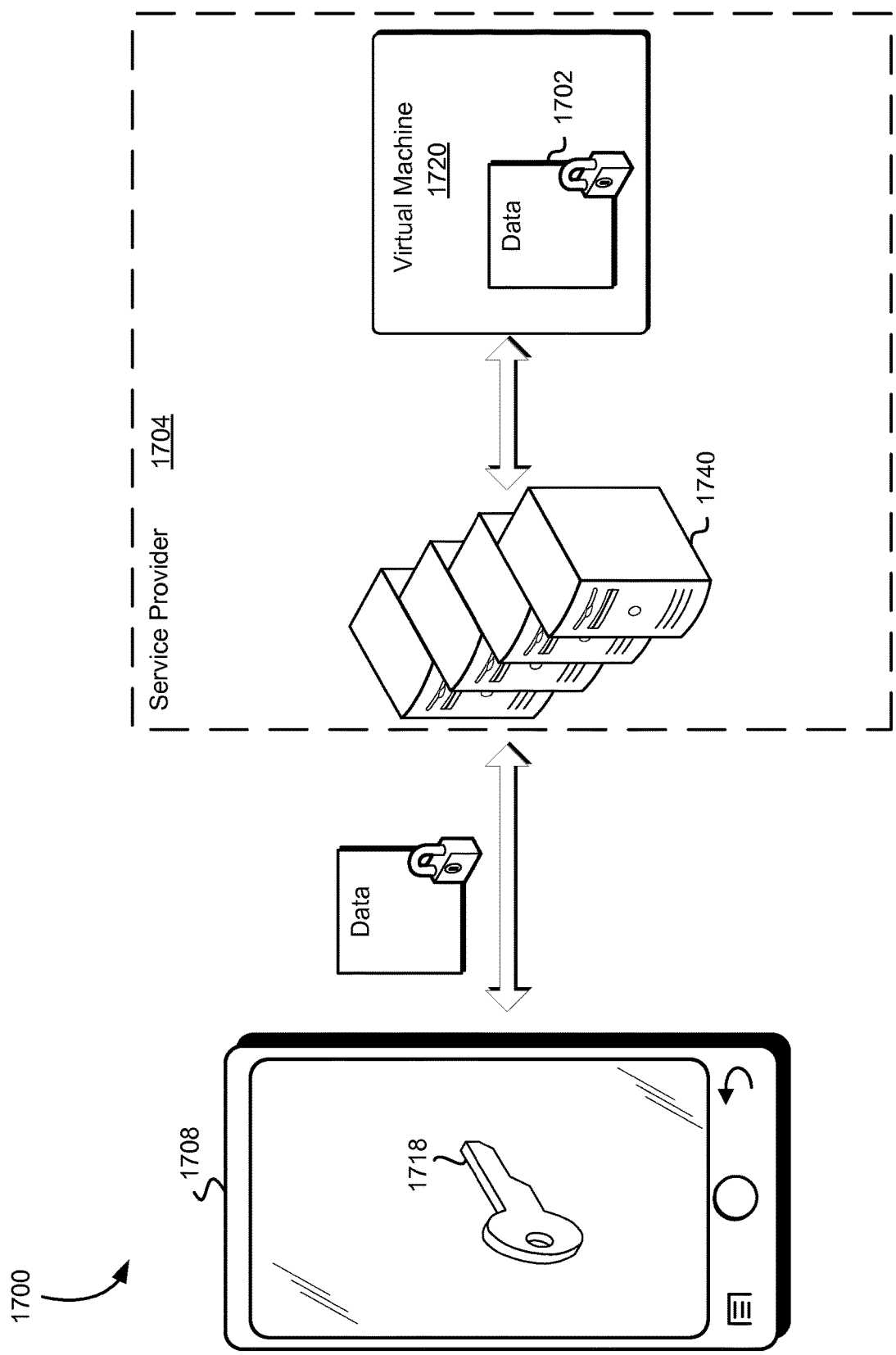
FIG. 17 is a diagram illustrating an environment for securing data in an instance-backed mobile device in accordance with at least one embodiment.

FIG. 17 illustrates an example environment 1700 where a mobile device 1708, as well as the associated code running thereon, may decrypt data provided by a companion virtual machine 1720. The companion virtual machine 1720 may execute application and perform various operations on behalf of the mobile device 1708, such an encrypting or otherwise securing data on behalf of the mobile device 1708. The mobile device 1708 may be any suitable computer system as described above. The service provider 1704 may operate system hardware 1740, described in greater detail above, used to execute the companion virtual machines 1720 and enable communication between the mobile device 1708 and the companion virtual machine 1720.

The companion virtual machine 1720 may include encrypted data 1702. The encrypted data 1702 may include a variety of different data. For example, the encrypted data 1702 may be an encrypted back up of data contained on the mobile device 1708 generated by the companion virtual machine 1720. In another example, the encrypted data 1702 may be received from another companion virtual machine. For example, the mobile device may include an application configured to transmit private messages between mobile devices. The mobile device 1708 may be configured such that the cryptographic key 1718 or other information required to decrypt the encrypted data 1702 is resident only in the mobile device 1708. The mobile device may include a cryptographic key 1718 suitable for decrypting the encrypted data 1702. Although a cryptographic key is illustrated in FIG. 17, any cryptographic operation suitable for protecting data is within the scope of the present disclosure. Cryptographic operations that may be performed in various embodiments include, but are not limited to, digital signature generation, digital signature verification, encryption, decryption and random number generation. Operations that utilize cryptographic keys include, but are not limited to, public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Example modes of block ciphers include, but are not limited to, the cipher-block chaining (CBC) mode, propagating cipher-block chaining (PCBC) mode, cipher feedback mode (CFB), output feedback (OFB) mode, counter (CTR) mode and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode. Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited, to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 18:
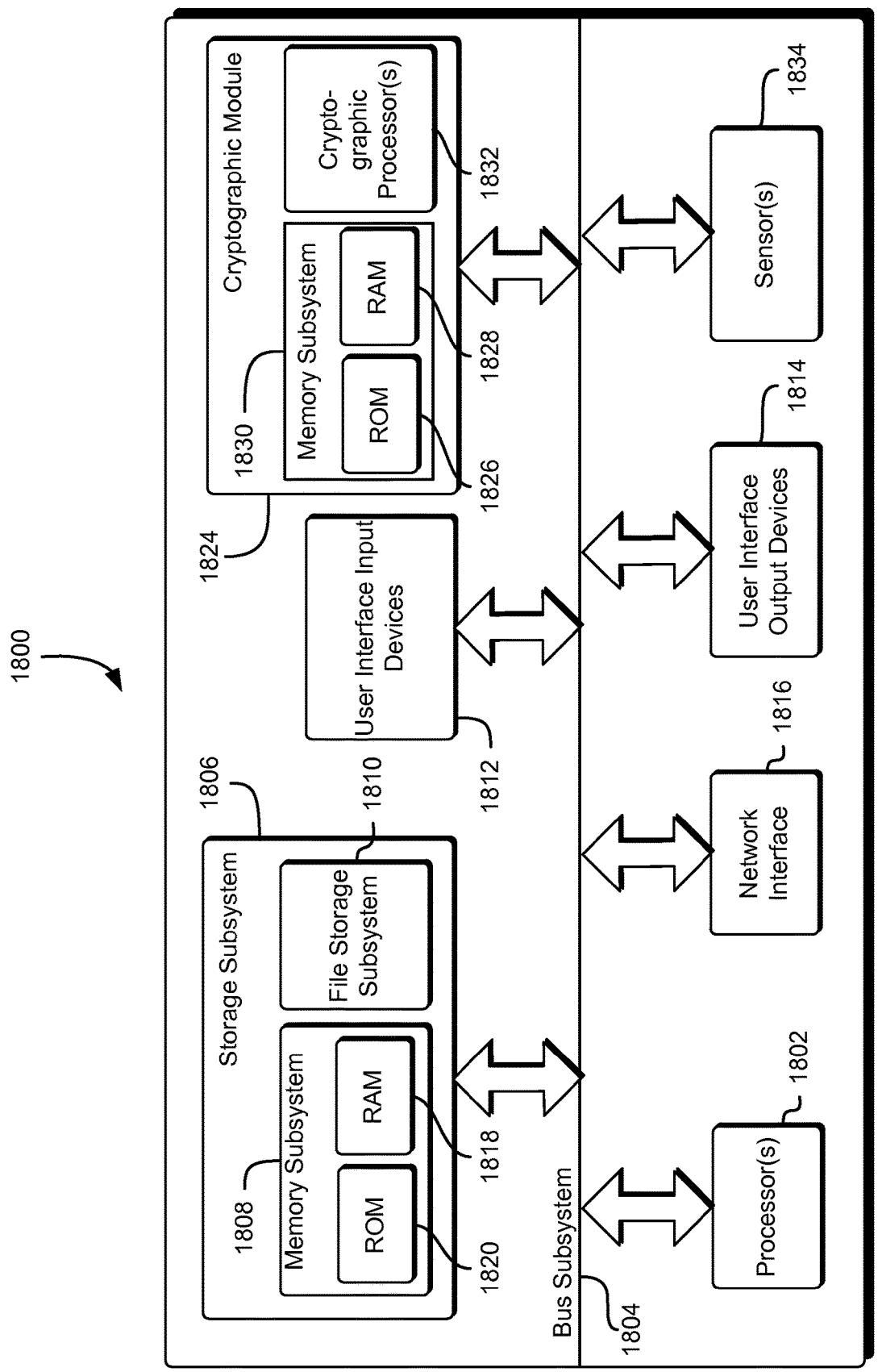
FIG. 18 shows an illustrative example of components of a computing device in accordance with at least one embodiment.

FIG. 18 is an illustrative, simplified block diagram of an example mobile device 1800 that may be used to practice at least one embodiment of the present disclosure. In various embodiments, the device system 1800 may be used to implement any of the systems illustrated herein and described above. For example, the device system 1800 may be used to implement a mobile device and other applications, such as a browser application, in accordance with various embodiments. As shown in FIG. 18, the device 1800 may include one or more processors 1802 that may be configured to communicate with and are operatively coupled to a number of peripheral subsystems via a bus subsystem

1804. These peripheral subsystems may include a storage subsystem 1806, comprising a memory subsystem 1808 and a file storage subsystem 1810, one or more user interface input devices 1812, one or more user interface output devices 1814, a network interface subsystem 1816, a cryptographic module 1824, comprising a memory subsystem 1830 and one or more cryptographic processors 1832. The peripheral subsystems may also include one or more sensors 1834 in addition to sensors of input devices 1812. Such sensors may include, but are not limited to, GPS sensors, accelerometers, temperature sensors and others.

The bus subsystem 1804 may provide a mechanism for enabling the various components and subsystems of device system 1800 to communicate with each other as intended. Although the bus subsystem 1804 is shown schematically as a single bus, alternative embodiments of the bus subsystem may utilize multiple busses.

The network interface subsystem 1816 may provide an interface to other device systems and networks. The network interface subsystem 1816 may serve as an interface for receiving data from and transmitting data to other systems from the device system 1800. For example, the network interface subsystem 1816 may enable transmission of application data and other information, such as electronic requests to access a system (e.g., receive a webpage) and may enable receipt of responses to the requests, such as webpages or other information. The network interface subsystem 1816 may also facilitate the receipt and/or transmission of data on other networks, such as an organization's intranet and/or other networks described below.

The user interface input devices 1812 may include one or more buttons, a keyboard, keypad, pointing devices, such as an integrated mouse, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in consuming applications, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 1800.

User interface output devices 1814, if any, may include a display subsystem, or non-visual displays, such as audio and/or tactile output devices, etc. Generally, the output devices 1814 may invoke one or more of any of the five senses of a user. The display subsystem may be a flat-panel device, such as a liquid crystal display (LCD), light emitting diode (LED) display, or a projection or other display device. In general, use of the term "output device" is intended to include all possible types of devices and mechanisms for outputting information from the device system 1800. The output device(s) 1814 may be used, for example, to present user interfaces to facilitate user interaction with applications performing processes described herein and variations therein, when such interaction may be appropriate. While a device 1800 with user interface output devices is used for the purpose of illustration, it should be noted that the device 1800 may operate without an output device, such as when the device 1800 is operated in a server rack and, during typical operation, an output device is not needed.

The storage subsystem 1806 may provide a computer-readable storage medium for storing the basic programming and data constructs that may provide the functionality of at least one embodiment of the present disclosure. The applications or components thereof (programs, code modules (i.e., programming modules), instructions) that, when executed by one or more processors, may provide the functionality of one or more embodiments of the present disclosure, may be stored in the storage subsystem 1806. These application modules or instructions may be executed by the one or more processors 1802. The storage subsystem 1806 may additionally provide a repository for storing data used in accordance with the present disclosure. The storage subsystem 1806 may comprise a memory subsystem 1808 and a file/disk storage subsystem 1810.

The cryptographic module 1824, which may be a trusted platform module (TPM), includes a memory subsystem 1830, including a main random access memory (RAM) 1828 for storage of instructions and data during program execution and a read only memory (ROM) 1826, in which fixed cryptographic information may be stored, such as a hardware secret stored securely within the device 1800 so as to be non-exportable (i.e., inaccessible through any call to the cryptographic module 1824). The cryptographic module 1824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 1800 may also store cryptographic keys in RAM 1828 and/or processor registers for temporary cryptographic processing. The cryptographic information stored in memory may be used in combination with cryptographic information obtained via the network interface 1816 and/or one or more of the user interface input devices 1812. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 1824 may be configured to collectively perform various operations used generating cryptographically verifiable information for authentication objects.

As noted above, in various embodiments of the present disclosure, hardware secrets are securely stored within the cryptographic module 1824. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 19:
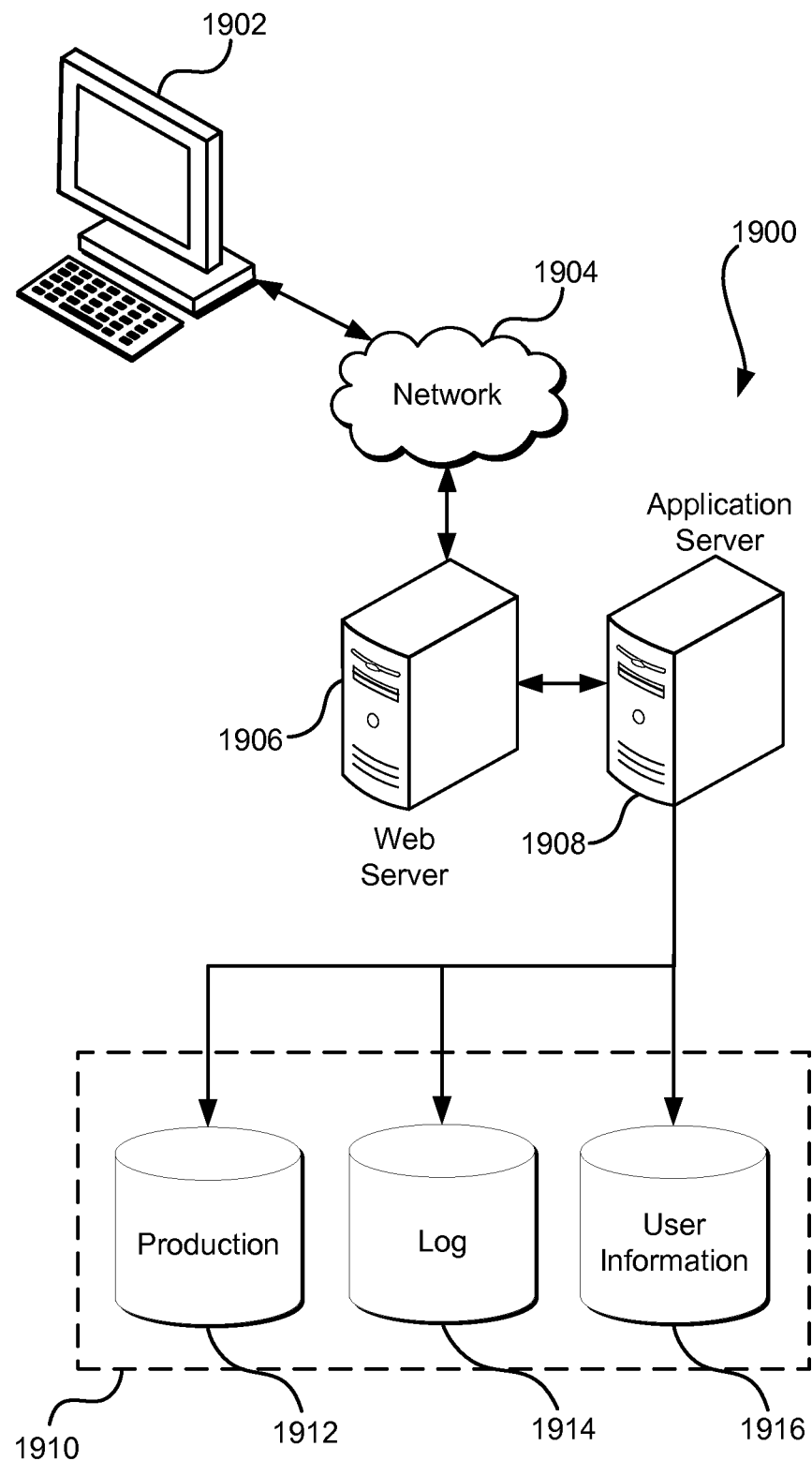
FIG. 19 illustrates an environment in which various embodiments can be implemented.

FIG. 19 illustrates aspects of an example environment 1900 for implementing aspects in accordance with various embodiments. As will be appreciated, although a web-based environment is used for purposes of explanation, different environments may be used, as appropriate, to implement various embodiments. The environment includes an electronic client device 1902, which can include any appropriate device operable to send and/or receive requests, messages or information over an appropriate network 1904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1906 for receiving requests and serving content in response thereto, although for other networks an alternative device serving a similar purpose could be used as would be apparent to one of ordinary skill in the art.

The illustrative environment includes at least one application server 1908 and a data store 1910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1902 and the application server 1908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1910 can include several separate data tables, databases, data documents, dynamic data storage schemes and/or other data storage mechanisms and media for storing data relating to a particular aspect of the present disclosure. For example, the data store illustrated may include mechanisms for storing production data 1912 and user information 1916, which can be used to serve content for the production side. The data store also is shown to include a mechanism for storing log data 1914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1910. The data store 1910 is operable, through logic associated therewith, to receive instructions from the application server 1908 and obtain, update or otherwise process data in response thereto. The application server 1908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:
1. A computer-implemented method, comprising:
receiving a request for a companion computer system associated with a mobile device;
in response to the request, instantiating the companion computer system by at least:
generating a record in a database associating the companion computer system and the mobile device; and loading a first component of a first application into memory of the companion computer system, where a second component of the first application is configured for execution by the mobile device;

receiving an indication of a second application associated with the mobile device;

as a result of the mobile device being associated with the companion computer system in the database:
load a first component of the second application into memory of the companion computer system, based at least in part on a notification generated by monitoring network connectivity with one or more networks during an interval of time which the mobile device experiences intermittent network connectivity to the one or more networks, wherein a second component of the second application is configured for execution by the mobile device; and performing, by the companion computer system, one or more operations of the first application and the second application on behalf of the mobile device.

2. The computer-implemented method of claim 1, wherein performing the one or more operations includes processing data obtained by the mobile device.

3. The computer-implemented method of claim 1, wherein
the notification is transmitted to an agent executed by the mobile device.

4. The computer-implemented method of claim 1, wherein performing the one or more operations includes:
obtaining information corresponding to a state of the mobile device; and
providing the obtained information to one or more other computer systems.

5. A system, comprising:
one or more processors; and
memory with instructions that, as a result of being executed by the one or more processors, cause the system to:
assign a first computer system to a second computer system and recording the assignment in a database based at least in part on receiving a request to associate the first computer system to the second computer system; and
as a result of the first computer system being associated with the second computer system in the database:
load a first component of an application onto the first computer system, based at least in part on a notification generated by monitoring network connectivity with one or more networks during an interval of time which the second computer system experiences intermittent network connectivity to the one or more networks, wherein the first component of the application causes the first computer system to operate in accordance with operation of a second component of the application executing on the second computer system.

6. The system of claim 5, wherein the first computer system is a companion virtual machine and the second computer system is a mobile device.

7. The system of claim 5, wherein the memory further includes instructions that, as a result of being executed by the one or more processors, cause the system to:
obtain, by the first computer system, data from the second component of the application executing on the second computer system; and
transmit the obtained data to a third computer system, where the third computer system includes the first component of the application.

8. The system of claim 5, wherein the instructions that cause the first computer system to operate in accordance with operation of the second component of the application further include instructions that, as a result of being executed by the one or more processors, cause the system to listen on a first port for the notification indicating the second computer system.

9. The system of claim 5, wherein the memory further includes instructions that, as a result of being executed by the one or more processors, cause the system to:
obtain, by the first computer system, data capture by one or more sensors of the second computer system; and
provide, to the second computer system, processed data based at least in part on the obtained data.

10. The system of claim 5, wherein the memory further includes instructions that, as a result of being executed by the one or more processors, cause the system to:
determine, based at least in part on state of the second computer system, to shift at least one operation of the application to the first computer system; and
cause the first computer system to perform the at least one operation of the application.

11. The system of claim 5, wherein the system further includes a database containing a record associating the first computer system and the second computer system, the record further containing information indicating a location of the first computer system.

12. The system of claim 11, wherein the memory further includes instructions that, as a result of being executed by the one or more processors, cause the system to:
receive a request indicating the first computer system; and
transmitting the request to the first computer system based at least in part on the location indicated in the database.

13. A non-transitory computer-readable storage medium having stored thereon executable instructions that, as a result of being executed by one or more processors of a first computer system, cause the first computer system to at least:
receive a request to load a first component of an application, the first component of the application corresponding to a second component of the application and the request associated with a second computer system;
determine, based at least in part on a record contained in a database, a third computer system assigned to the second computer system; and
load the first component of the application, based at least in part on a notification generated by monitoring network connectivity with one or more networks during an interval of time which the second computer system experiences intermittent network connectivity to the one or more networks, onto the third computer system.

14. The non-transitory computer-readable storage medium of claim 13, wherein the instructions further comprise instructions that, as a result of being executed by the one or more processors, cause the first computer system to load a third component of another application where the third component corresponds to a fourth component of the other application associated with the second computer system.

15. The non-transitory computer-readable storage medium of claim 13, wherein the instructions further comprise instructions that, as a result of being executed by the one or more processors, cause the first computer system to update the record contained in the database with information corresponding to the third computer system being assigned to the second computer system.

16. The non-transitory computer-readable storage medium of claim 13, wherein the instructions that cause the computer system to determine the third computer system assigned to the second computer system further include instructions that cause the computer system to determine, as a result of receiving the request, the third computer system is assigned to the second computer system based at least in part on the database containing the record indicating the third computer system is assigned to the second computer system.

17. The non-transitory computer-readable storage medium of claim 13, wherein the instructions further comprise instructions that, as a result of being executed by the one or more processors, cause the first computer system to instantiate the third computer system based at least in part on a determination that no computer system is assigned to the second computer system.

18. The non-transitory computer-readable storage medium of claim 13, wherein the instructions further comprise instructions that, as a result of being executed by the one or more processors, cause the first computer system to transmit the request to the third computer system based at least in part on the determination that the third computer system is assigned to the second computer system.

19. The non-transitory computer-readable storage medium of claim 13, wherein the second computer system includes an agent, wherein the agent transmits data between the first component of the application and the second component of the application.

20. The non-transitory computer-readable storage medium of claim 13, wherein the third computer system is a virtual container included in a virtual machine operated by the first computer system and the second computer system is a mobile device.

* * * * *